US012667866B1

(12) United States Patent
Jeong et al.

(10) Patent No.: US 12,667,866 B1
(45) Date of Patent: Jun. 30, 2026

(54) APPARATUS FOR SORTING RAW COFFEE BEANS BASED ON DEFECT DETECTION

(71) Applicants: Geonwoo Solution, Seoul (KR); Eggstone CO., LTD, Seoul (KR); Elite Sigma Solution LLC, Vancouver, WA (US)

(72) Inventors: Samuel Seok Jae Jeong, Vancouver, WA (US); In Jae Chung, Gyeonggi-do (KR); Ji Hoon Chung, Seoul (KR); Shin Won Yu, Seoul (KR)

(73) Assignees: Geonwoo Solution, Seoul (KR); Eggstone CO., LTD, Seoul (KR); Elite Sigma Solution LLC, Vancouver, WA (US)

( * ) Notice: Subject to any disclaimer, the term of this patent is extended or adjusted under 35 U.S.C. 154(b) by 0 days.

(21) Appl. No.: 19/432,557

(22) Filed: Dec. 24, 2025

Related U.S. Application Data

(63) Continuation of application No. 19/321,984, filed on Sep. 8, 2025, now Pat. No. 12,533,713.

(30) Foreign Application Priority Data

Apr. 17, 2025 (KR) ........................ 10-2025-0049976

(51) Int. Cl.

| | |
|---|---|
| ***B07C 5/342*** | (2006.01) |
| ***B07C 1/18*** | (2006.01) |
| ***B07C 5/36*** | (2006.01) |

(52) U.S. Cl.

CPC .............. *B07C 5/3425* (2013.01); *B07C 1/18* (2013.01); *B07C 5/3422* (2013.01); *B07C 5/368* (2013.01); *B07C 2501/009* (2013.01)

(58) Field of Classification Search

CPC ....... B07C 5/3425; B07C 1/18; B07C 5/3422; B07C 5/368; B07C 2501/009

See application file for complete search history.

(56) References Cited

U.S. PATENT DOCUMENTS

2020/0360969 A1* 11/2020 Lien .................... G06F 18/2413
2024/0390947 A1* 11/2024 Teng ........................ B07C 5/342
2025/0161992 A1* 5/2025 Hwang ................. B07C 5/3422

FOREIGN PATENT DOCUMENTS

JP 2023-115692 A 8/2023
KR 10-2447429 B1 9/2022
KR 10-2024-0013628 A 1/2024

OTHER PUBLICATIONS

Korean Office Action in Korean Appln No. 2025-0049976, dated Jan. 29, 2026, 6 pages.

* cited by examiner

*Primary Examiner* — Jacob S. Scott
*Assistant Examiner* — Miraj T. Patel
(74) *Attorney, Agent, or Firm* — Fish & Richardson P.C.

(57) ABSTRACT

A bean defect sorter includes a container configured to store beans, a transfer guide configured to receive the beans from the container and to guide each bean in series, the transfer guide being configured to discharge the beans one by one, a rotary configured to rotate in a predetermined direction and to receive each of the beans discharged from the bean dispenser, an imaging device configured to provide a bean image of one or more of the beans, a processor including a learning algorithm that is configured to classify each bean as one of a normal bean, a defective bean, and an indeterminable bean, a bean sorter configured to discharge each bean from the rotary by using air pressure according to a classification result, a storage configured to store each of the normal bean, the defective bean, and the indeterminable bean, and a residual bean collector to process escaped beans.

13 Claims, 25 Drawing Sheets

APPARATUS FOR SORTING RAW COFFEE BEANS BASED ON DEFECT DETECTION

CROSS-REFERENCE TO RELATED APPLICATIONS

This application is a continuation of U.S. application Ser. No. 19/321,984, filed on Sep. 8, 2025, now allowed, which claims priority to Korean Patent Application No. 10-2025-0049976, filed on Apr. 17, 2025, the entire contents of which are incorporated herein for all purposes by this reference.

TECHNICAL FIELD

The present disclosure relates to a green bean defect sorter, and more specifically, to a green bean defect sorter capable of sorting green bean defects using an image learning algorithm.

BACKGROUND

Specialty coffee refers to coffee that has received a standard score of 80 points or more based on evaluation by the Specialty Coffee Association of America (SCAA) among coffee beans grown in special environments such as geography, climate, production area, etc.

The taste of coffee can be generally determined by four key factors: the quality of the green beans, optimal roasting, proper grinding, and correct extraction.

The taste quality of specialty coffee can vary depending on whether the green beans—the primary raw material—are defective. Common defects in coffee beans include mold, insect bites, surface damage or imperfections, and discoloration caused by storage conditions or environmental factors.

SUMMARY

The present disclosure describes a green bean defect softer capable of allowing a pile of green beans stored in a storing container to be supplied to a green bean compartment as kernels, namely one bean after another.

The present disclosure further describes a green bean defect sorter, in which the green bean kernels seated on the green bean rotary compartment are seated one by one in a predetermined space of the green bean rotary compartment, thereby easily acquiring multiple images of the each green bean kernel to take photographs at least two directions—top and bottom—for sorting defects of the seated green beans by using multiple cameras.

The present disclosure further describes a green bean defect sorter capable of reducing the volume of equipment, which mainly targets a small-scale workplace or a home office, as well as low noise of the operation when sorting the green bean defects.

According to one aspect of the subject matter described in the present disclosure, a green bean defect sorter includes: a storing container configured to store green beans; a conical rotating plate to discharge green beans from the storing container; a green bean dispenser configured to receive the green beans from the conical rotating plate and move the supplied green beans to discharge kernels thereof one by one; a green bean compartment rotated in a predetermined direction and configured to have the green beans discharged from the green bean dispenser seated thereon; an imaging device of two cameras configured to photograph the green bean kernel seated on the green bean rotary compartment and provide two images—top and bottom—of the photographed green bean kernel; two cameras are located predetermined positions of in the direction circumference to avoid the light interference of the two cameras; two or more images are required for a green bean for a processor configured to determine if the green bean kernel is defective or not by using an image learning algorithm and decide the green bean kernel as one of a normal green bean, a defective green bean, and an indeterminable green bean, a green bean sorter configured to sort the seated green bean kernel by using air pressure according to a result decided by the processor; and a sorted green bean storage configured to store the normal green bean, the defective green bean, and the indeterminable green bean sorted by the green bean sorter, in which the green bean rotary compartment includes: a disk lower plate formed with a plurality of through-holes; a disk upper plate coupled to the disk lower plate and configured to have a plurality of partition walls forming a seating space provided with the cross section having a triangular shape and accommodate with the plurality of through-holes; and a support plate formed of a transparent material and mounted at the disk lower plate and configured to block the bean from dropping through the through-holes and the seating space, thereby allowing the green bean kernel to be seated thereon.

The disk lower plate can include an air inlet hole on an outer circumferential surface thereof, which allows air supplied from the air pump to be supplied to the green bean kernel seated on the support plate formed of a transparent material, and the disk upper plate can include, on an inner circumferential surface thereof facing the air inlet hole, a green bean-drop opening connected to the sorted green bean storage such that the green bean kernel pushed out by the air introduced through the air inflow can be accommodated in the sorted green bean storage.

The disk upper plate can include vertical linear bars on an outer circumferential surface to prevent the green bean, which otherwise may escape through the air inlet hole by centrifugal force while the disk is rotating before the green bean kernel is sorted by the green bean sorter.

The disk upper plate can include a lattice-type air discharge holes on an inner circumferential surface thereof facing the green bean-drop opening with a lattice-type air discharge holes, through which the air introduced into the air inlet hole is discharged.

The green bean dispenser can include the green bean transfer path through which the green bean dispensed from the storing container, and the green bean transfer path can include a V-shaped groove, of which a central portion protrudes downward.

The green bean dispenser can include the green bean transfer path through which the green bean dispensed from the storing container, and the green bean transfer path can be formed in a spiral shape.

The green bean dispenser can further include a vibration motor provided to generate vibration in the green bean transfer path.

It can further include a green bean supply regulator mounted at a lower end of the green bean transfer path to adjust an interval between green bean kernels discharged from the green bean transfer path.

The green bean supply regulator can include a support connected to the green bean transfer path, a green bean detecting sensor mounted at the support and configured to detect the green bean discharged from the green bean transfer path, a transfer belt on which the green bean passing through the green bean detecting sensor is seated; and a control motor configured to adjust an interval between adjacent green beans by adjusting a rotation speed of the transfer belt, in which the green bean rotary compartment rotational speed can be adjusted by synchronize the belt and the disk rotating motors speeds such that the green bean can be dropped down from the transfer belt to the designated compartment of the rotary compartment.

It can further include an anti-splashing guide connected to the transfer belt and provided to cover a partial region of the green bean rotary compartment.

The green bean sorter can include: a first air pump configured to generate air pressure toward the green bean kernel positioned at a support plate formed of a transparent material of the green bean rotary compartment; a second air pump configured to generate air pressure toward the green bean kernel positioned at a support plate formed of a transparent material of the green bean rotary compartment; a normal green bean processing block mounted nearby the green bean rotary compartment, connected to the first air pump to receive the air pressure, and configured to push the green bean, which is determined as the normal green bean by the processor, to the sorted green bean storage using the received air pressure; a defective green bean processing block mounted nearby the green bean rotary compartment, connected to the second air pump to receive the air pressure, and having a first solenoid valve configured to push the green bean, which is determined as the defective green bean by the processor, to the sorted green bean storage using the received air pressure; and an indeterminable green bean processing block mounted nearby the green bean rotary compartment, connected to the second air pump to receive the air pressure, and having a second solenoid valve configured to push the green bean, which is determined as the indeterminable green bean by the processor, to the sorted green bean storage using the received air pressure.

The first air pump and the second air pump can maintain an operating state during the green bean sorting.

The defective green bean solenoid block may have an air release hole to discharge the air from the second air pump before the first solenoid valve is operated.

The indeterminable green bean solenoid block may have an air release hole to discharge the air from the second air pump before the second solenoid valve is operated.

It can further include a residual green bean collector that is mounted beneath of the green bean rotary compartment and configured to temporarily hold green bean kernel separated from the green bean rotary compartment due to irregular bouncing and to subsequently transfer to the sorted green bean storage.

The residual green bean collector can be divided into a first region configured to collect the green bean kernel before being photographed by the lower camera and a second region configured to collect the green bean kernel after being photographed by the lower camera.

The first region can be provided with: a first residual green bean transfer path through which the green bean kernels are moved; and a first residual green bean processing hole through which the green bean kernels moved along the first residual green bean transfer path are discharged from the first region, in which the first residual green bean processing path can make a connection between the first residual green bean processing hole and the sorted green bean storage.

The second region can be provided with: a second residual green bean transfer path through which the green bean kernels are moved; and a second residual green bean processing path through which the green bean kernels moved along the second residual green bean transfer path is discharged from the second region, in which the second residual green bean processing path can make a connection between the second residual green bean processing hole and the sorted green bean storage.

The first residual green bean transfer path can include a first groove, the second residual green bean transfer path can include a second groove, and the green bean defect sorter can further include a green bean processing device, which is mounted at a lower end of the residual green bean collector, has a partial region thereof inserted into the first groove, has a different partial region thereof inserted into the second groove, and is connected to the sorted green bean storage.

The residual green bean collector can further include a vibration motor which is mounted at the green bean processing device and generates vibration in the first residual green bean transfer path and the second residual green bean transfer path.

In some implementations, a pile of green beans accommodated in a storing container can be supplied as green bean kernels onto a green bean rotary compartment by a spiral green bean transfer path and a green bean supply regulator provided at the end of the green bean transfer path. In addition, the green beans can be supplied to the green bean rotary compartment through the green bean supply regulator in a state where a supply speed and an interval of the green beans are adjusted by synchronizing the belt motor and the disk motor, thereby allowing the green beans to be stably seated in a seating space of the green bean rotary compartment, and significantly reducing a phenomenon in which the green beans are stuck or caught on between the seating space.

In some implementations, a longitudinal section of a plurality of partition walls forming the seating space can have a triangle, and thus the green bean kernels supplied to the green bean kernel cannot be placed on the plurality of partition walls rather than the seating space, thereby smoothly obtaining the images for determining the defect of the green beans using cameras of an imaging device.

In some implementations, as the green bean kernels positioned in the seating space of the green bean rotary compartment are pushed to a corresponding green bean storage by using a solenoid valve and air pressure, a compressor and an air compression storage tank, which are components of a pneumatic device, can be eliminated to reduce the whole volume of the sorter as well as noise generated. In addition, the cost for manufacturing the defect sorter can be significantly reduced.

DETAILED DESCRIPTION

Figure 1:
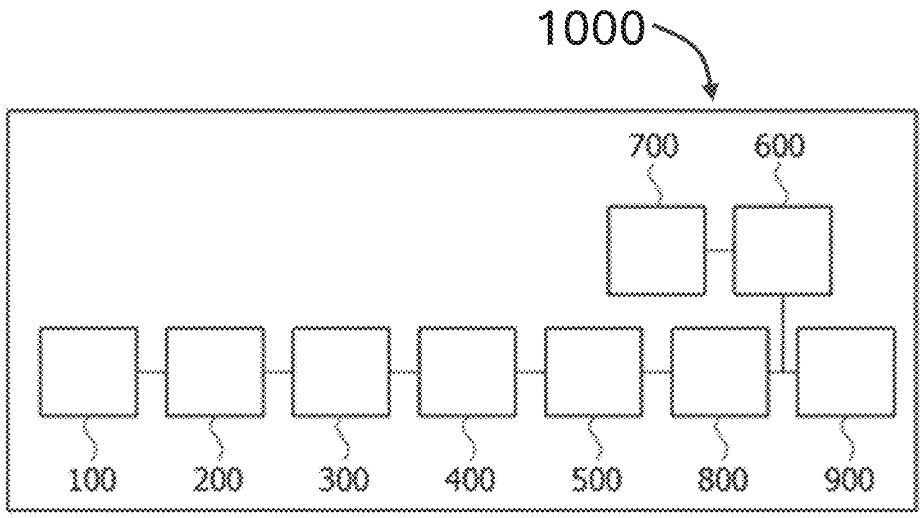
FIG. 1 is a configuration view showing an example of a green bean defect sorter.

Hereinafter, a green bean defect sorter 1000 according to an implementation of the present disclosure will be described in detail with reference to the drawings.

In addition, regardless of reference numerals, the same or corresponding components are given the same or similar reference numerals, and duplicate descriptions thereof will be omitted, and the size and shape of each component illustrated can be exaggerated or reduced for convenience of description.

In the present application, the term “green bean” can refer to a raw coffee bean before being roasted, and the term “kernel” can refer to an individual (single) coffee bean.

Figure 2:
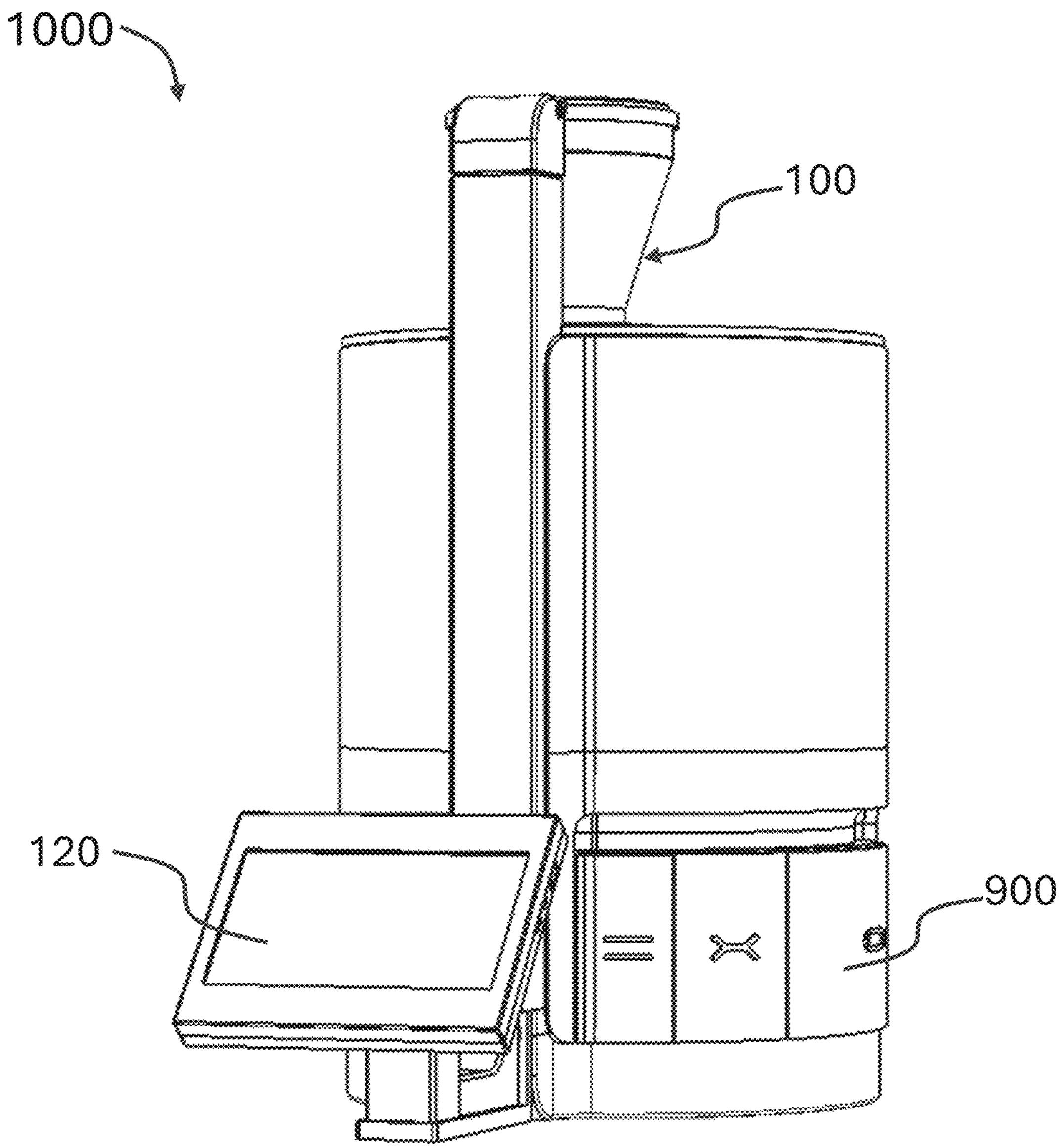
FIG. 2 is a view showing an appearance of the green bean defect sorter.
Figure 3:
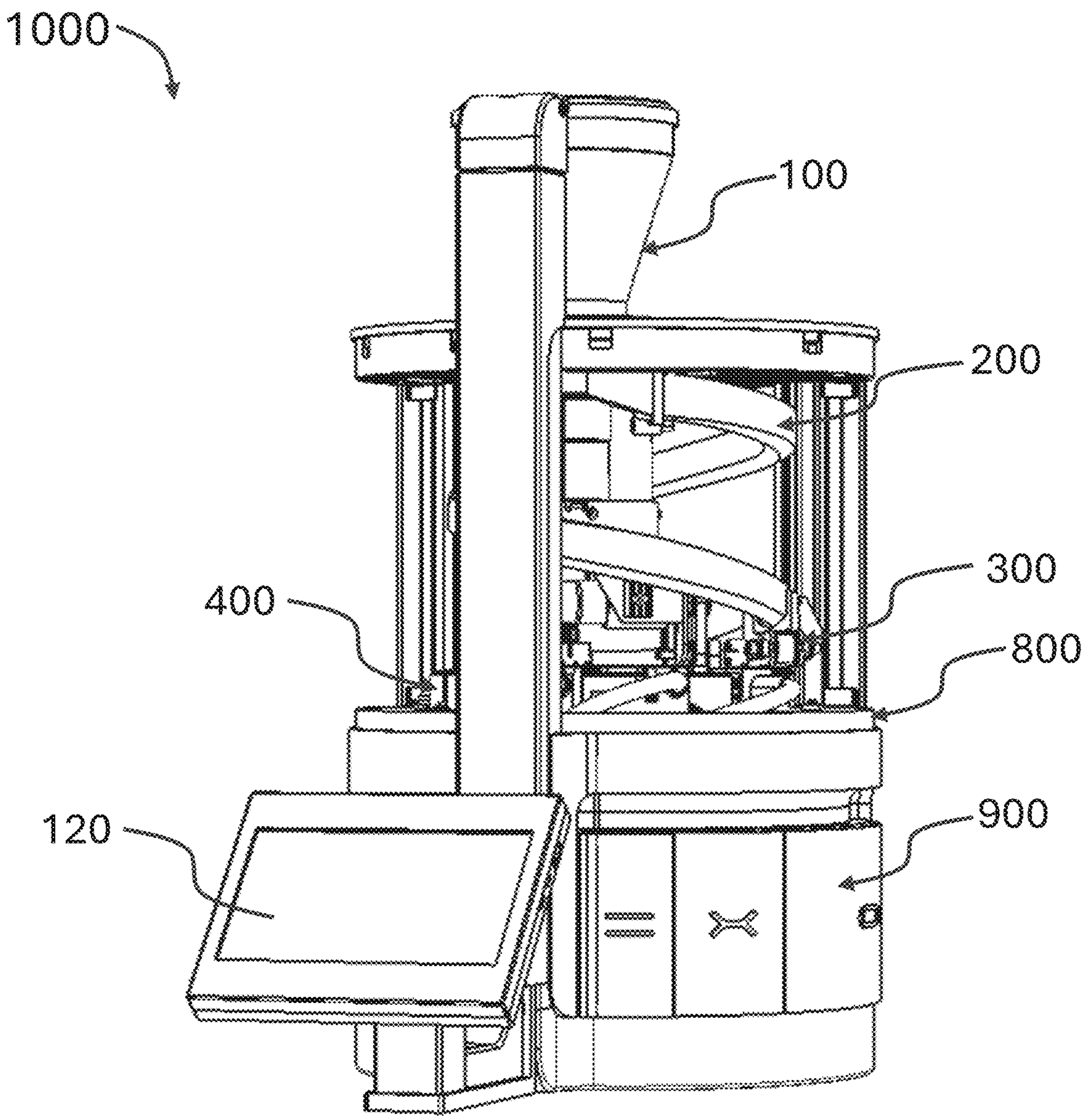
FIG. 3 is a view showing an inside of the green bean defect sorter shown in FIG. 2 after removing a portion thereof.
Figure 4:
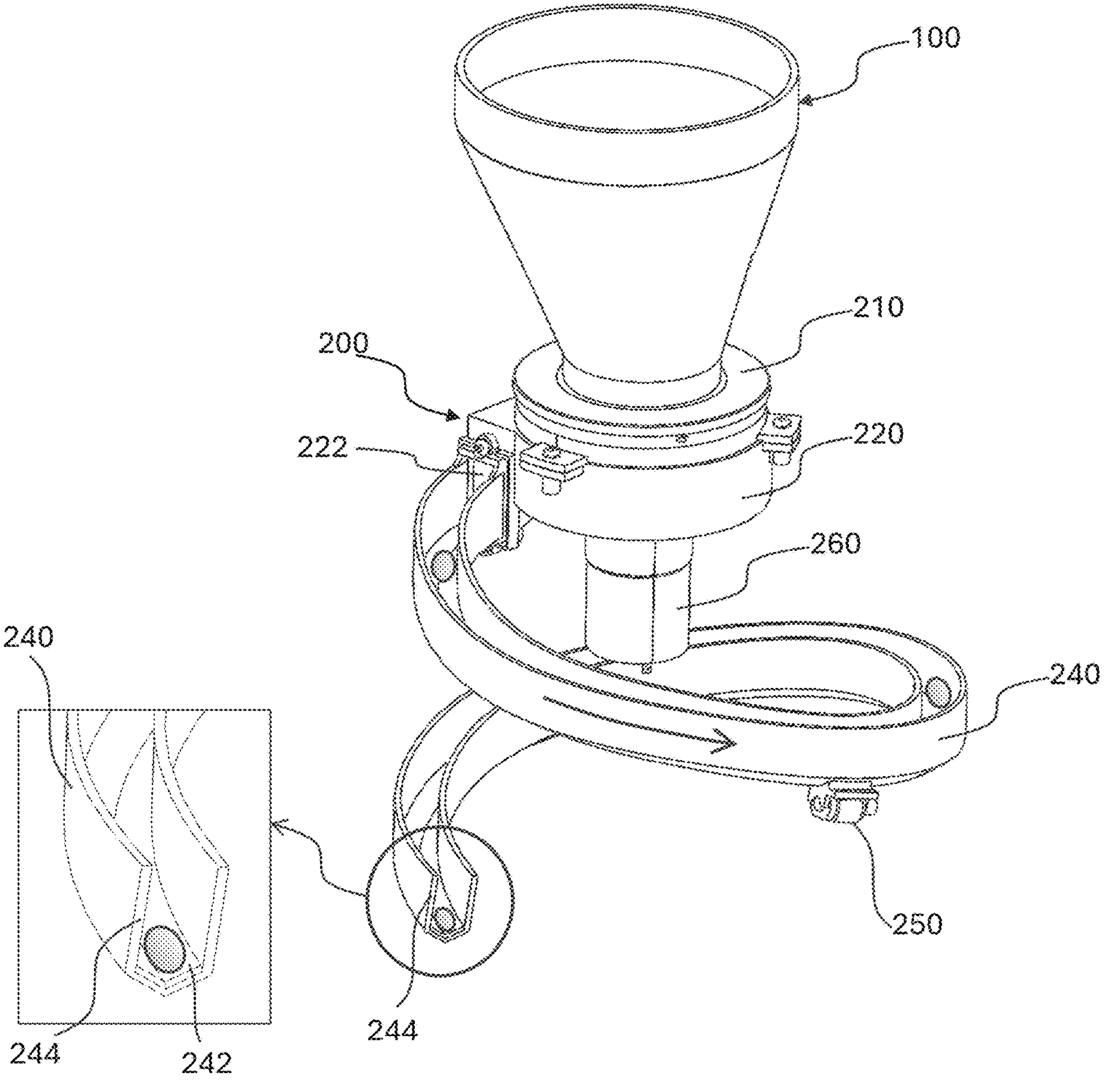
FIG. 4 is a view showing an example of a storing container and a green bean transfer path in the green bean defect sorter shown in FIG. 3.
Figure 5:
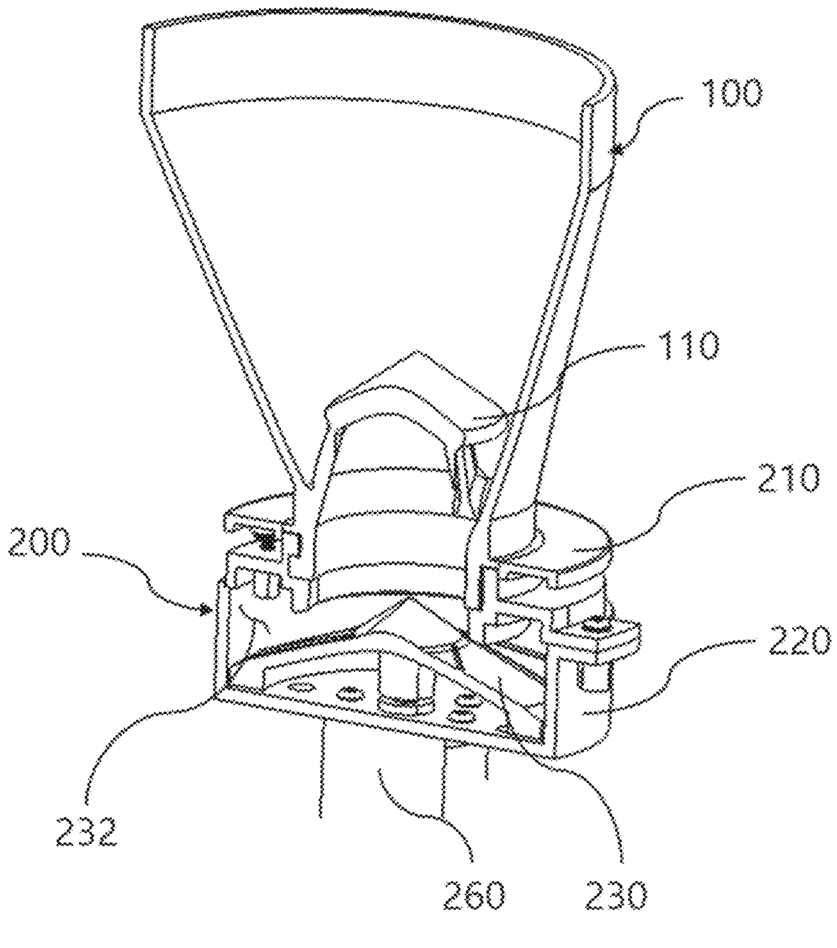
FIG. 5 is a cross-sectional view showing the storing container and the conical rotating plate built in green bean dispenser except for a green bean transfer path shown in FIG. 4.

FIG. 1 is a configuration view showing a green bean defect sorter, FIG. 2 is a view showing an appearance of a green bean defect sorter, and FIG. 3 is a view showing an inside of the green bean defect sorter shown in FIG. 2 after removing a portion thereof. FIG. 4 is a view showing a storing container and a green bean transfer path in the green bean defect sorter shown in FIG. 3, and FIG. 5 is a cross-sectional view showing a storing container and a conical green bean dispenser except for a green bean transfer path shown in FIG. 4.

Referring to FIGS. 1 to 5, a green bean defect sorter 1000 can include a storing container 100, a green bean dispenser 200, a green bean supply regulator 300, a green bean rotary compartment 400, an imaging device 500, a processor 600, a green bean sorter 700, a residual green bean collector 800, and a sorted green bean storage 900.

A large amount of green beans can be stored in the storing container 100.

The storing container 100 can have a hopper shape with a lower end thereof opened.

The green beans stored in the storing container 100 can have a storable size. For example, the green beans can have a size of 100 to 1000 g, 200 to 800 g, or 300 to 600 g, but can have a size of 400 to 500 g in terms of miniaturization.

In addition, the storing container 100 can have a conical support 110 formed therein. The conical support 110 can serve to distribute a total load of a large amount of stored green beans.

The storing container 100 can be provided with a display device 120.

The display device 120, which is a user interface of the green bean defect sorter 1000, may not only allow a user to input a menu through a screen touch, but also allow the user to monitor a process of sorting green beans being performed in the green bean defect sorter 1000 in real time.

For example, a sorting processing time such as a high speed, a medium speed, and a low speed in the green bean defect sorter 1000 can vary depending on the user's selection in the display device 120.

The green bean dispenser 200 can receive green beans from the storing container 100 and allow the supplied green beans to be dispensed to the green bean transfer path.

The green bean dispenser 200 can include an upper frame 210 connected to a lower end of the storing container 100, a lower frame 220 coupled to the upper frame 210, a conical rotating plate 230 mounted inside a structure in which the upper frame 210 and the lower frame 220 are coupled and rotated in a predetermined direction so that a small amount of green beans are discharged from the storing container 100, and a green bean transfer path 240 connected to the opening 222 to move the green beans dispensed through the opening 222.

The upper frame 210 can communicate with an inside of the storing container 100.

The lower frame 220 can communicate with an inside of the upper frame 210. The opening 222, through which green beans stored in the storing container 100 are supplied, can be formed at one side of the lower frame 220.

The conical rotating plate 230 can form a predetermined gap space 232 with the upper frame 210. Accordingly, when the conical rotating plate 230 stops without rotating, the gap space 232 can be fully filled with green beans, thereby preventing the green beans from being dispense to the green bean transfer path 240 through the opening 222.

A conical rotating plate driving motor 260 can be mounted at the lower end of the conical rotating plate 230.

The conical rotating plate driving motor 260 can rotate the conical rotating plate 230 in a predetermined direction.

For example, the conical rotating plate driving motor 260 can rotate the conical rotating plate 230 in a counterclockwise direction, so that the green beans stored in the storing container 100 can be supplied to the opening 222 of the conical rotating plate 230 in a small amount through the upper frame 210 and the lower frame 220.

The green bean transfer path 240 can be connected to the opening 222 of the lower frame 220.

At the end of the green bean transfer path 240, a discharge port 244 can be defined and configured to discharge the green beans supplied through the opening 222.

The green bean transfer path 240 can be formed in a spiral shape.

In addition, the green bean transfer path 240 can include a groove 242.

The groove 242 can be formed so that a central portion thereof protrudes to a lower end of the green bean transfer path 240 and can have a V-shaped longitudinal cross-section.

Accordingly, when a pile of the green beans dispensed by the conical rotating plate 230 of the storing container 100 are moved along the green bean transfer path 240 through the opening 222 of the lower frame 220, the pile of the green beans dispensed can be separated into kernels by the green bean transfer path 240 having the V-shaped groove 242 and spirally formed and thus can be supplied to the green bean rotary compartment 400.

In addition, the green bean transfer path 240 can further include a first vibration motor 250.

The first vibration motor 250 can generate vibration on the green bean transfer path 240.

The first vibration motor 250 can be mounted at a lower end of the green bean transfer path 240. For example, the first vibration motor 250 can be disposed at a lower end of the green bean transfer path 240.

The first vibration motor 250 can prevent the movement of green beans from being congested or aggregated on the green bean transfer path 240 having a gentle slope.

Figure 6:
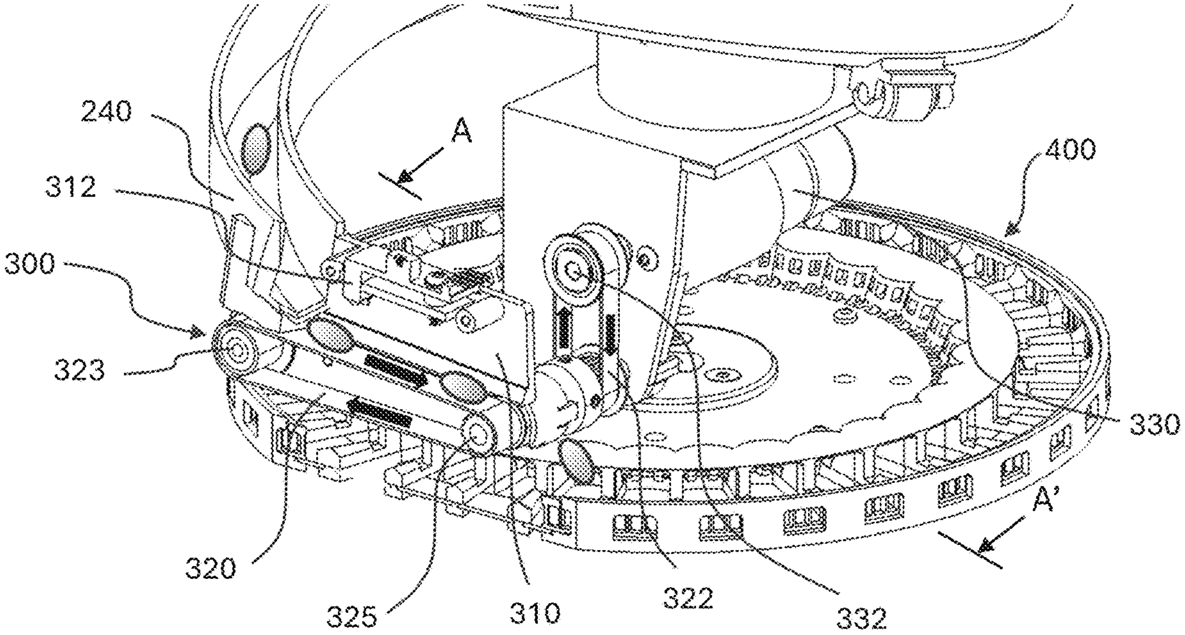
FIG. 6 is a view showing an example of a green bean supply regulator and a green bean rotary compartment that are located at a green bean transfer path shown in FIG. 3.
Figure 7:
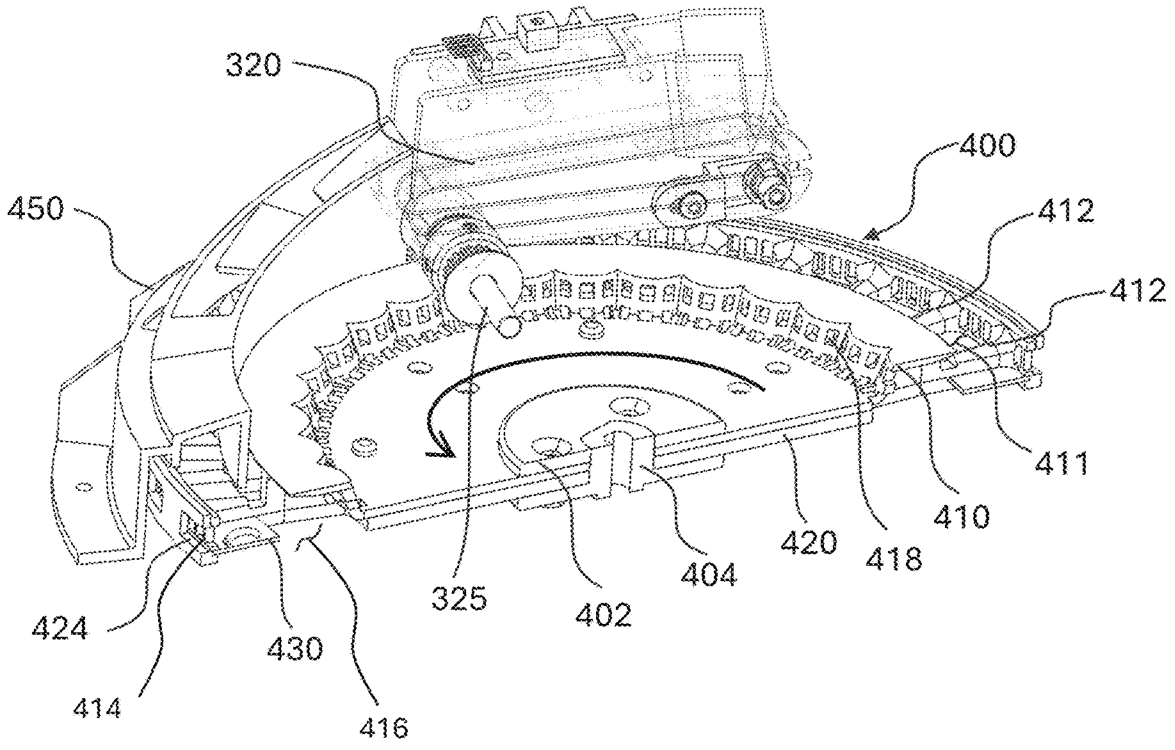
FIG. 7 is the cross-sectional view taken along line A-A' shown in FIG. 6.
Figure 8:
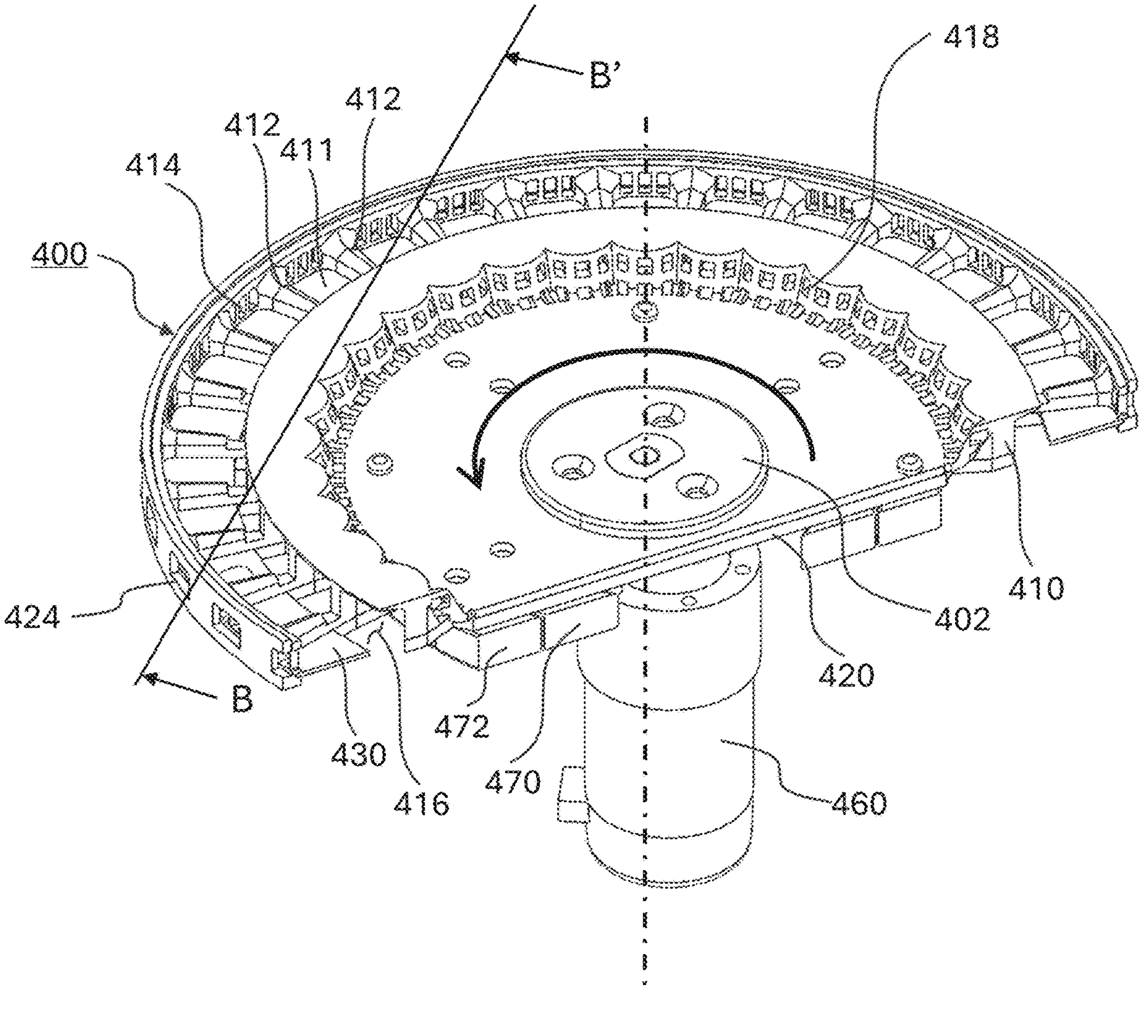
FIG. 8 is a view showing a green bean rotary compartment shown in FIG. 7.
Figure 9:
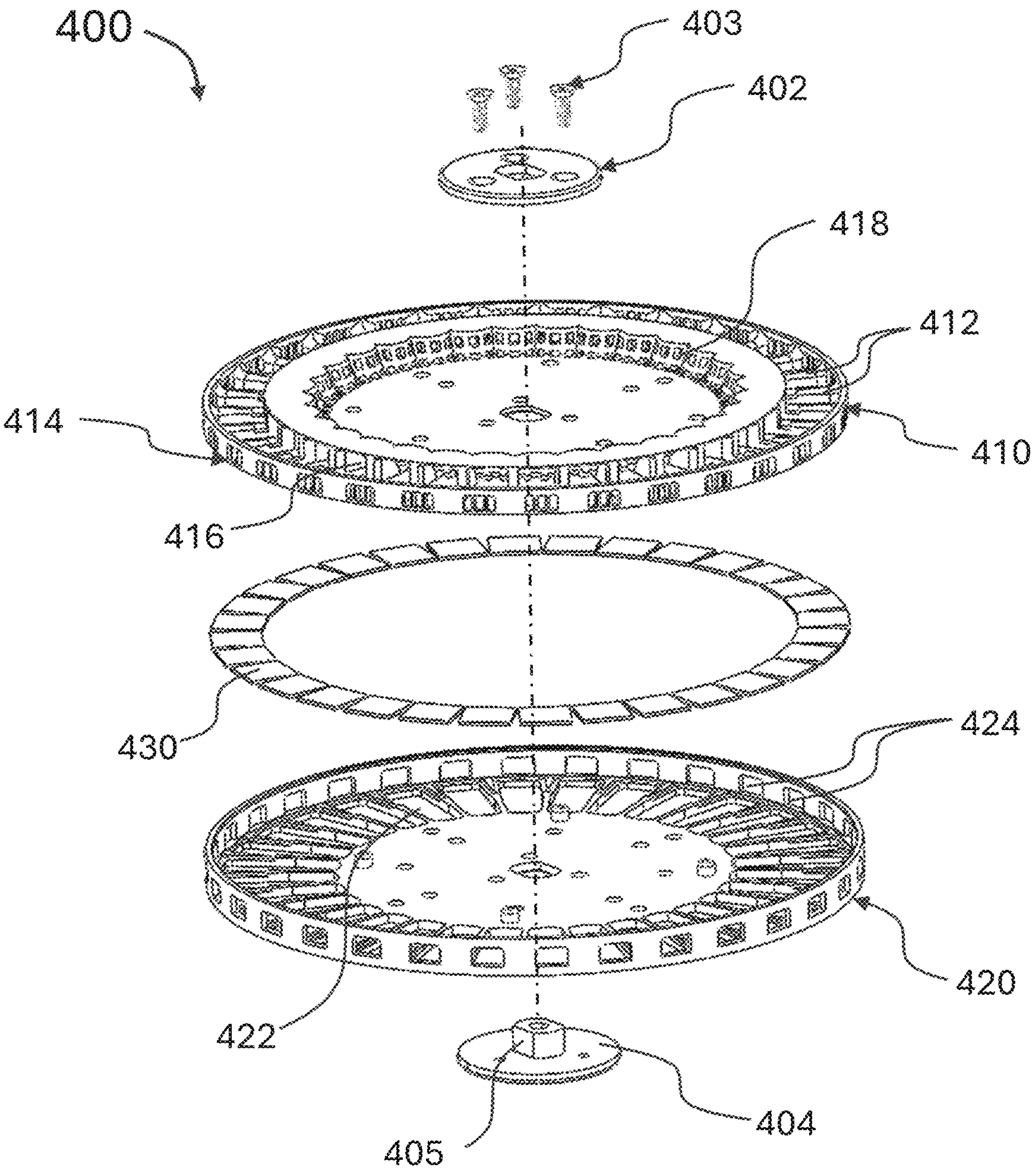
FIG. 9 is an exploded perspective view showing the green bean rotary compartment except for a control motor shown in FIG. 8.
Figure 10:
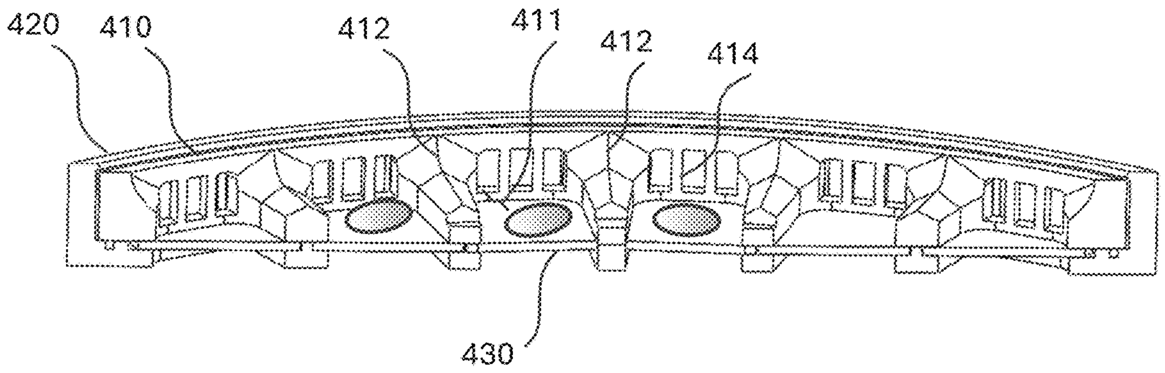
FIG. 10 is the cross-sectional view taken along line B-B' shown in FIG. 8.
Figure 11:
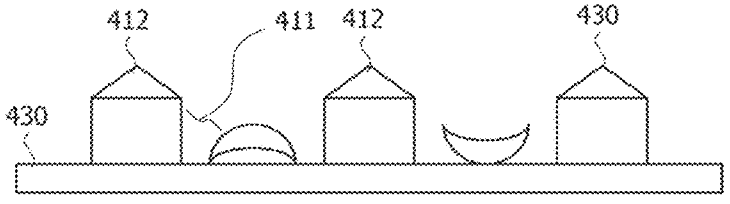
FIG. 11 is a view schematically showing an example of a plurality of partition walls, a support plate formed of a transparent material, and green beans shown in FIG. 10.
Figure 12:
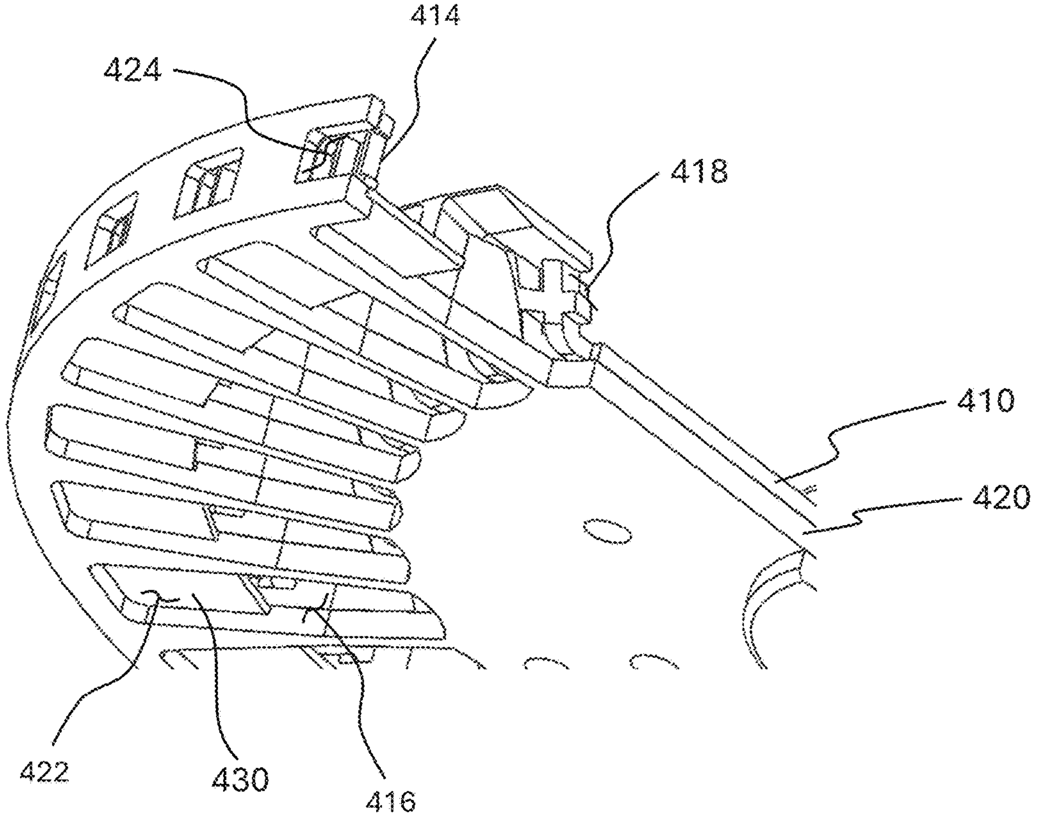
FIG. 12 is a bottom view showing the green bean rotary compartment shown in FIG. 8.

FIG. 6 is a view showing a state in which a green bean supply regulator and a green bean rotary compartment are mounted at a green bean transfer path shown in FIG. 3, and FIG. 7 is a cross-sectional view taken along line A-A' shown in FIG. 6. FIG. 8 is a view showing a green bean rotary compartment shown in FIG. 7, and FIG. 9 is an exploded perspective view showing a green bean rotary compartment except for a control motor shown in FIG. 8. FIG. 10 is a cross-sectional view taken along line B-B' shown in FIG. 8, FIG. 11 is a view schematically showing a plurality of partition walls, a support plate 430, which is made of a transparent material, and green beans shown in FIG. 10, and FIG. 12 is a bottom view showing a green bean rotary compartment shown in FIG. 8.

Referring to FIGS. 6 and 7, the green bean defect sorter 1000 can further include a green bean supply regulator 300.

The green bean supply regulator 300 can adjust an interval between the green bean kernels discharged from the green bean transfer path 240.

In addition, the green bean supply regulator 300 can be configured to adjust the supply speed of the green bean kernels supplied to the green bean rotary compartment 400.

The green bean supply regulator 300 can be mounted beneath the end of the green bean transfer path 240, and can be connected to a discharge port 244.

The green bean supply regulator 300 can include a supporter 310 connected to the discharge port 244 of the green bean transfer path 240, a green bean detecting sensor 312 mounted at the supporter 310 and configured to detect green beans discharged from the green bean transfer path 240 to the transfer belt 320 on which the green beans passing through the green bean detecting sensor 312 are seated, and a control motor 330 configured to adjust an interval between the green beans by adjusting a rotation speed of the driving belt 322 and the speed of the transfer belt 320.

The control motor 330 can be mounted beneath the conical rotating plate driving motor 260.

A first belt shaft 323 and a second belt shaft 325 having a predetermined distance from each other can be provided at the supporter 310. The first belt shaft 323 and the second belt shaft 325 can be connected by the transfer belt 320. The driving pulley 332 of the control motor 330 can be connected to the second belt shaft 325 through the driving belt 322.

When the control motor 330 is operated to rotate the driving pulley 332, the second belt shaft 325 connected to the driving belt 322 can be rotated, and the first belt shaft 323 connected to the transfer belt 320 can be rotated by the rotation of the second belt shaft 325.

When the rotation speed of the driving belt 322 is changed according to the driving state of the control motor 330, the rotation speed of the transfer belt 320 can be also changed. As described above, the rotation speed of the transfer belt 320 can be adjusted by adjusting the driving state (or the operating state) of the control motor 330.

A plurality of green beans discharged from the green bean transfer path 240 can be moved along the transfer belt 320 in a state in which an interval between adjacent green bean kernels is adjusted by the driving of the control motor 330.

A control motor 460 (rotary compartments driving motor) can be configured to adjust the rotational speed of the rotary compartments 400 according to rotating speed information of the belt driving motor 330 from the processor 600, thereby synchronizing the bean drop interval to ensure that each bean kernel is deposited onto a respective rotary compartment.

In this case, the green bean supply regulator 300 can be positioned at an upper side of the green bean rotary compartment 400, and thus the plurality of green bean kernels moved along the transfer belt 320 can be dropped down to the green bean rotary compartment 400 rotating counter-clockwise.

In some implementations, the green bean defect sorter 1000 can further include an anti-splashing guide 450.

The anti-splashing guide 450 can be positioned a front side of the transfer belt 320, the anti-splashing guide 450 being configured to cover a partial region of the green bean rotary compartment 400.

In FIG. 7, an anti-splashing guide 450 can provide a guide such that, when the green bean kernels on the transfer belt 320 are dropped down to the green bean rotary compartment 400, the dropped green bean kernels may not bounce from the green bean rotary compartment 400 to an outside, but can be stably seated on the green bean rotary compartment 400.

Referring to FIGS. 7 to 12, the green bean rotary compartment 400 can include a disk lower plate 420 defining a plurality of through-holes 422 (in FIG. 9), a disk upper plate 410 coupled to the disk lower plate 420 and having a plurality of partition walls 412 forming a seating space 411 communicating with the plurality of through-holes 422 (in FIG. 9), and a support plate 430, which is made of a transparent material, positioned between the disk lower plate 420 and the disk upper plate 410, mounted at the disk lower plate 420, and blocks a portion of the through-holes 422 and the seating space 411 to allow the green bean kernels to be seated thereon.

The disk lower plate 420 and the disk upper plate 410 can be coupled to each other.

The disk upper plate 410 can be mounted inside the disk lower plate 420.

In this case, the disk lower plate 420 and the disk upper plate 410 can be axially coupled to each other by a first connection member 402 and a second connection member 404.

In FIG. 9, The first connection member 402 can be mounted at the disk upper plate 410 by at least one bolt 403, and the second connection member 404 can be mounted at the disk lower plate 420 through a mounting protrusion 405 formed to protrude from the second connection member 404.

In FIG. 8, The disk upper plate 410 and the disk lower plate 420, which are coupled to each other, can be rotated in a predetermined direction by a control motor 460 on which an encoder is mounted, and the green bean kernels discharged from the green bean transfer belt 320.

In addition, one or more ring bearings 470 and 472 can be mounted between the disk lower plate 420 and the control motor 460.

The ring bearings 470 and 472 can prevent shaking and provide stability of the rotational motion when the disk upper plate 410 and the disk lower plate 420 coupled to each other rotate.

In this case, among the ring bearings 470 and 472, the inner ring bearing 470 can be fixed to the residual green bean collector 800, which will be described later, by a plurality of bolts and nuts, and the outer ring bearing 472 can be connected by the bolts and nuts passing through the disk upper plate 410 and the disk lower plate 420, thereby minimizing vertical shaking when the disk upper plate 410 and the disk lower plate 420 coupled to each other rotate.

In some implementations, the disk lower plate 420 can define an air inlet hole 424.

Figure 14:
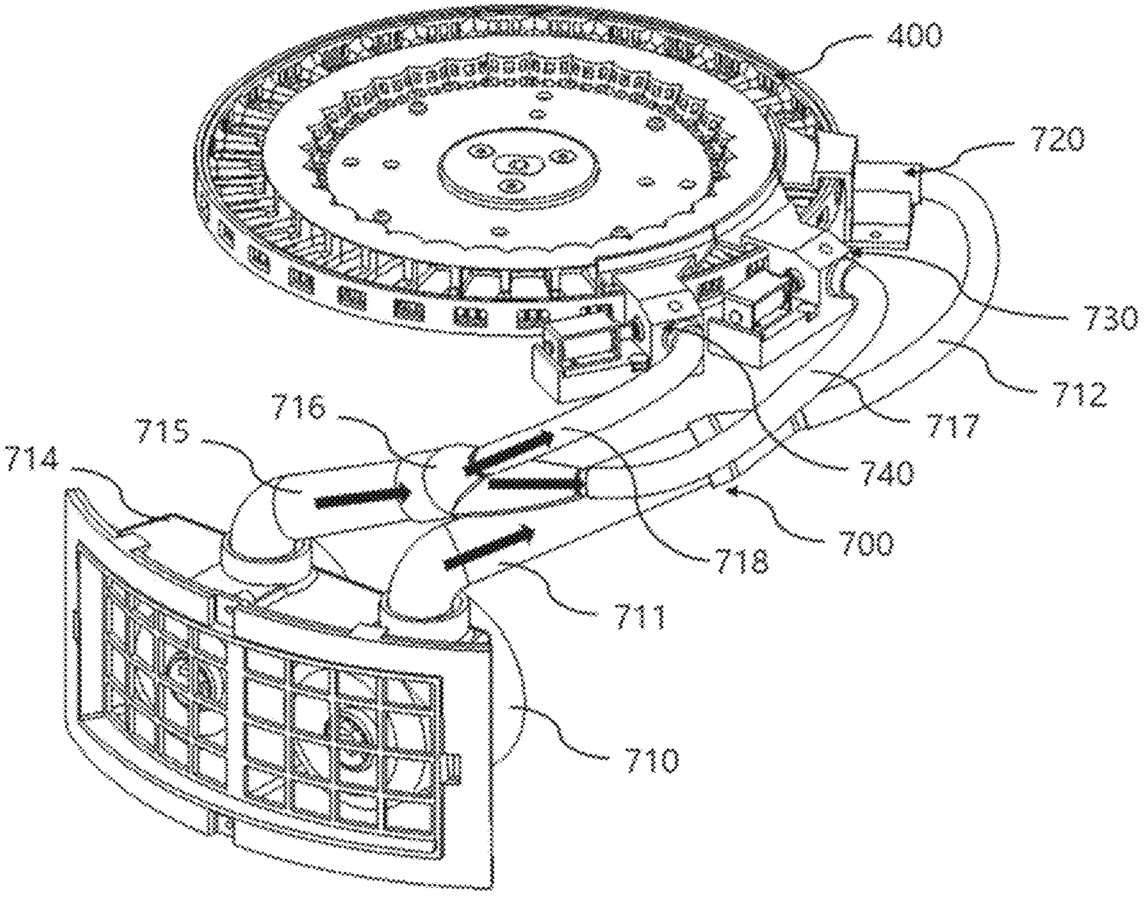
FIG. 14 is a view showing the green bean sorter mounted near the green bean rotary compartment shown in FIG. 13.

In FIG. 12 and FIG. 14, The air inlet hole 424 can allow the air supplied from air pumps 710 and 714 (in FIG. 14) to be supplied to the green bean kernels seated on the support plate 430 formed of a transparent material.

In FIG. 12, The air inlet hole 424 can be located along an outer circumferential surface of the disk lower plate 420 at a predetermined interval.

In FIG. 10, The disk upper plate 410 can include a plurality of partition walls 412.

The plurality of partition walls 412 can be provided at a predetermined interval along the circumference of the disk upper plate 410.

Among the plurality of partition walls 412, a space between two adjacent partition walls 412 can be a seating space 411 in which the green bean kernels are seated. The support plate 430 formed of a transparent material can be positioned in seating space 411.

For example, the number of the seating spaces 411 can vary depending on the number of the plurality of partition walls 412. The number of the seating spaces 411 needs to be the same as the number of partition walls 412.

In FIG. 11, In addition, an upper end portion of the plurality of partition walls 412 can have a cross section having a triangular shape. Accordingly, the green bean kernels may not be placed at an upper end of the plurality of partition walls 412, but can be positioned in the seating space 411, thereby allowing the imaging device 500 (in FIG. 13) to normally photograph an image of the green bean kernels.

In FIG. 12, in addition, the disk upper plate 410 can include a green bean-drop openings 416.

The green bean-drop openings 416 can be defined at an inner circumferential surface of the disk upper plate 410 for a portion of the through-hole 422 that is not covered by support plate 430 formed of a transparent material.

In addition, the disk upper plate 410 can include a green bean escape preventing vertical linear bars 414 connecting with the air inlet hole 424. When the disk upper plate 410 and disk lower plate 420 are coupled, the air inlet holes 424 and the linear bars 414 are combined to define air inlet grid holes configured to prevent bean escape by the vertical bars 414.

The green bean escape preventing vertical linear bars 414 can prevent the green bean kernels seated on the support plate 430 formed of a transparent material from being escaped to an outside of the green bean rotary compartment 400 through the air inlet hole 424.

For example, the green bean escape preventing vertical linear bars 414 can have a shape having a plurality of gratings, and an interval between the plurality of gratings can be smaller than the size of the green bean kernels seated on the support plate 430 formed of a transparent material so that the green bean kernels may not be escaped through the air inlet hole 424.

The green bean escape preventing vertical linear bars 414 can be provided in plural to penetrate along an outer circumferential surface of the disk upper plate 410 at a predetermined interval.

In this case, the number of the air inlet holes 424, the green bean-drop openings 416 can be the same as each other.

In addition, the disk upper plate 410 can include an air discharge lattice-type grid 418 (lattice grid openings).

For example, the air discharge lattice-type grid 418 can allow the air introduced through the air inlet hole 424 to push the green bean kernels to the green bean-drop openings 416, and then the remaining air to be discharged to an outside of the green bean rotary compartment 400.

The air discharge lattice-type grid 418 can penetrate along an inner circumferential surface of the disk upper plate 410 facing the green bean-drop openings 416 at a predetermined interval.

Accordingly, the air inlet hole 424 and the air discharge lattice-type grid 418 may be arranged to face each other, and the green bean-drop openings 416 can be positioned between the air inlet hole and dis discharge lattice-type grid.

In addition, the air discharge lattice-type grid 418 can be provided in the form of a window including a plurality of holes. In this case, the plurality of holes can be provided in a size smaller than the size of the green bean kernels to prevent the green bean kernels may not be discharged through the air discharge lattice-type grid 418.

Figure 13:
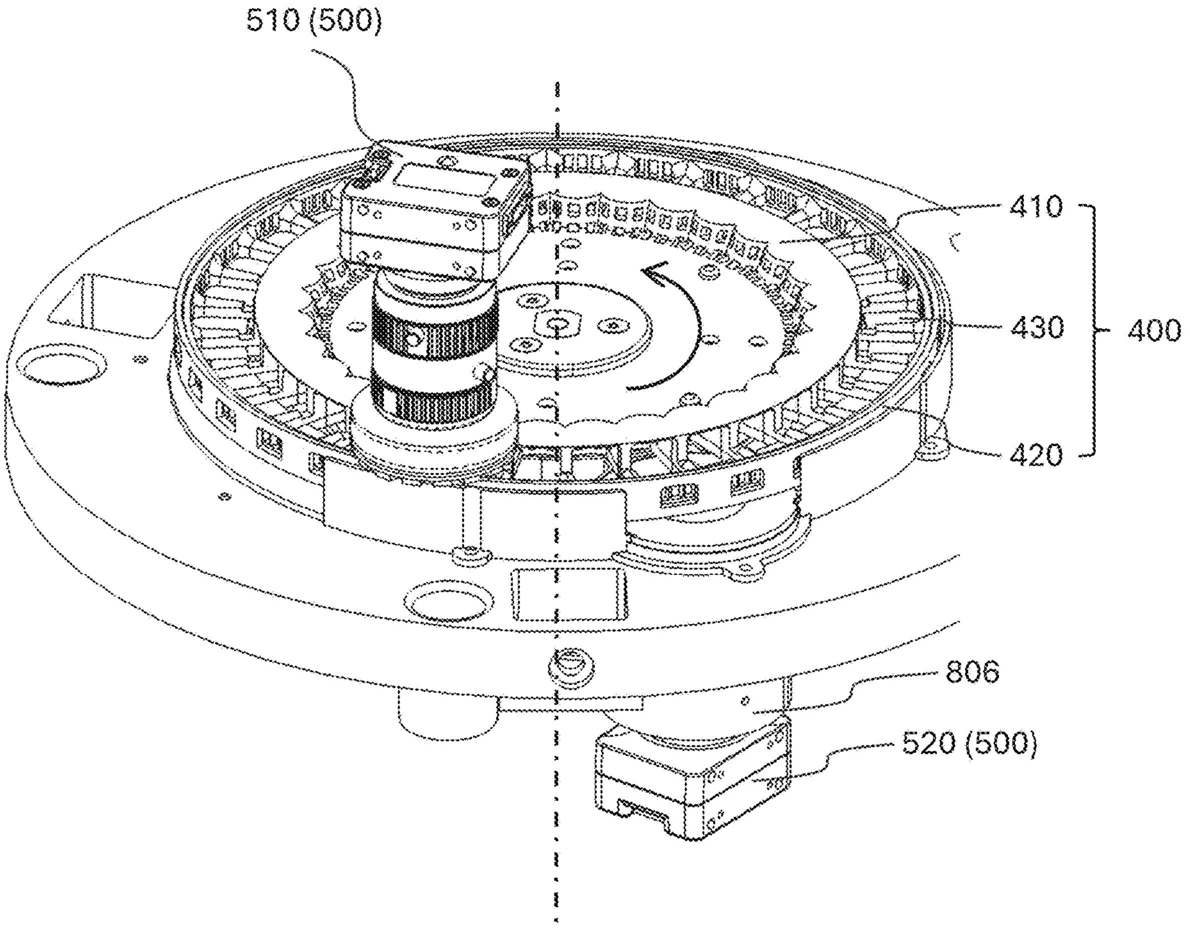
FIG. 13 is a view showing the rotary compartments and the upper and lower cameras that are located at the top and bottom sides of the green bean rotary compartment.

FIG. 13 is a view showing the rotary compartments 400 and two imaging devices 500 including, for example, upper camera 510 and lower camera 520.

The cameras 510 and 520 can photograph the green bean kernels seated on the green bean rotary compartment 400 and provide two images of the photographed green bean kernels.

The upper camera 510 for photographing an upper portion of the green bean kernels and a lower camera 520 for photographing a lower portion of the green bean kernels.

The upper camera 510 can be positioned at an upper side of the green bean rotary compartment 400 can photograph an upper image (the mounting feature is not showing here), and the lower camera 520 can photograph a lower image of the green bean kernels in a state of being positioned at a lower side of the green bean rotary compartment 400 through the camera installing hole 806. The lower side image can photograph by see through the support plate formed of a transparent material.

The first job of the processor 600 can provide an image of one green bean kernel completed by merging upper and lower images of the green bean kernel captured by the upper camera 510 and the lower camera 520.

The processor 600 can determine whether the green bean kernel is defective or not from the provided green bean kernel image using an image learning algorithm (or a deep-learning algorithm). For example, the processor 600 can include an integrated electric circuit, a computer chip, a controller, a microprocessor, and memories for the images saving.

The processor 600 can determine whether the green bean kernel is a normal green bean without defects, a defective green bean with defects, or an indeterminable green bean whose defects may not be determined.

The image learning algorithm of the processor 600 can refer to an algorithm having a function of comparing previously stored images of the normal green bean kernel with a provided image of the green bean kernel to determine whether the green bean is defective or not.

For example, the image learning algorithm can include Convolutional Neural Network (CNN) and ResNet.

The image learning algorithm using the Convolutional Neural Network (CNN) and the ResNet (Residual Network) can include: step 1) dividing a pre-training images into training and validation; step 2) carrying out normalization and pixel mean subtraction; step 3) setting a hyper-parameter value including a batch size, an epoch size, and a learning rate; step 4) giving a variation to the image to be trained as a whole to perform data augmentation for increasing diversity and quantity; and step 5) performing detailed adjustment and selection of the ResNet model to learn. In some examples, an optimal value of green beans can be set as a hyper-parameter value including a batch size, an epoch size, and a learning rate.

The processor 600 can determine whether the green beans are defective or not using an exemplary image learning algorithm as above and sort the green beans into normal green beans, defective green beans, and indeterminable green beans, thus dramatically improving the accuracy of green bean defect sorting.

FIG. 14 is a view showing a state in which a green bean sorter 700 is located against the green bean rotary compartment 400, and FIGS. 15 to 19 are views for describing an operation of the green bean sorter shown in FIG. 14.

Referring to FIGS. 14 to 19, the green bean sorter 700 can sort the green bean kernels seated on the green bean rotary compartment 400 by using air pressure according to the result decided by the processor 600.

Figure 17A:
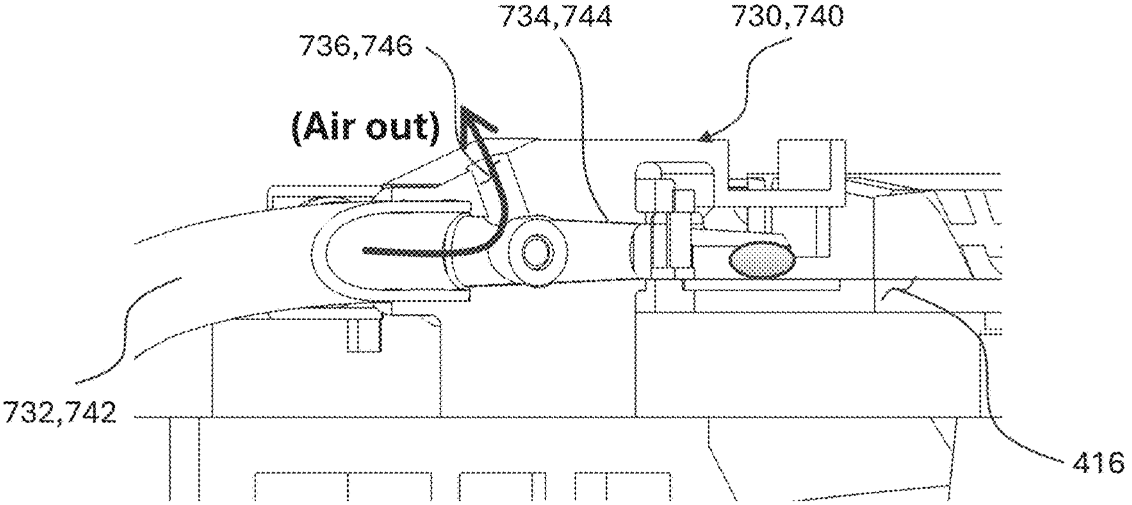
Figure 17B:
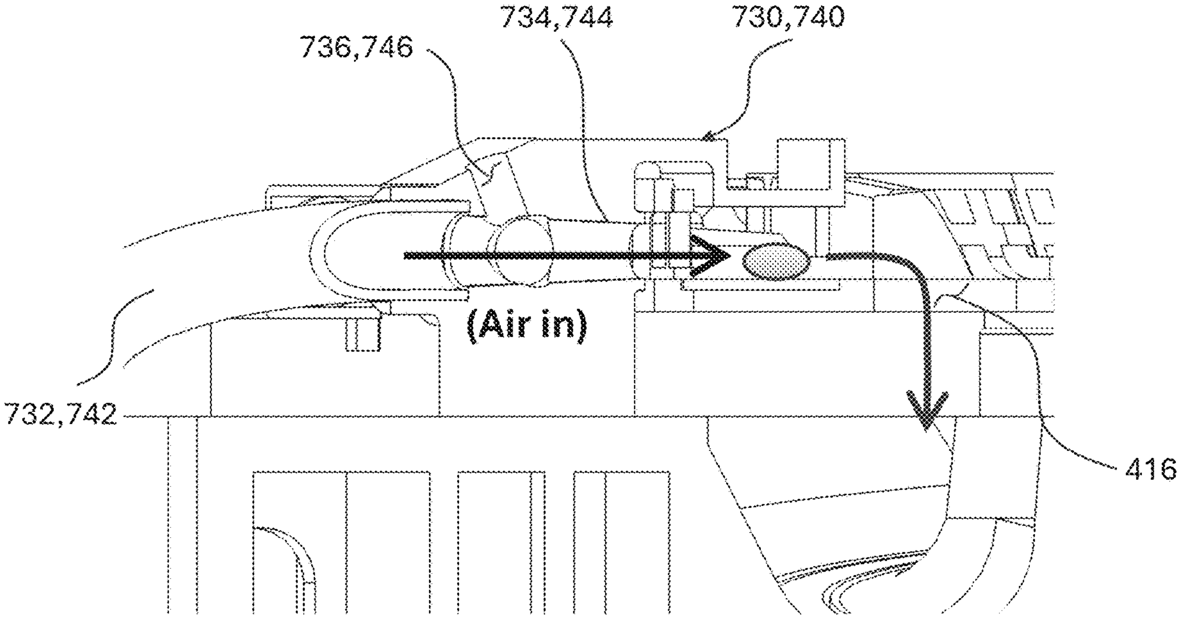
Figure 18:
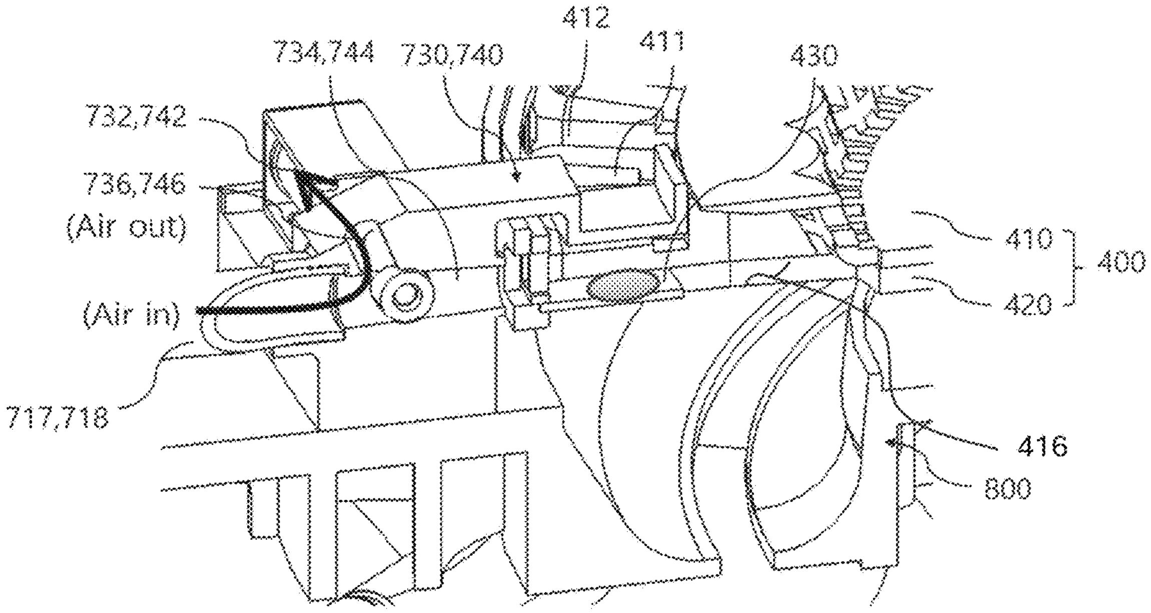
Figure 19:
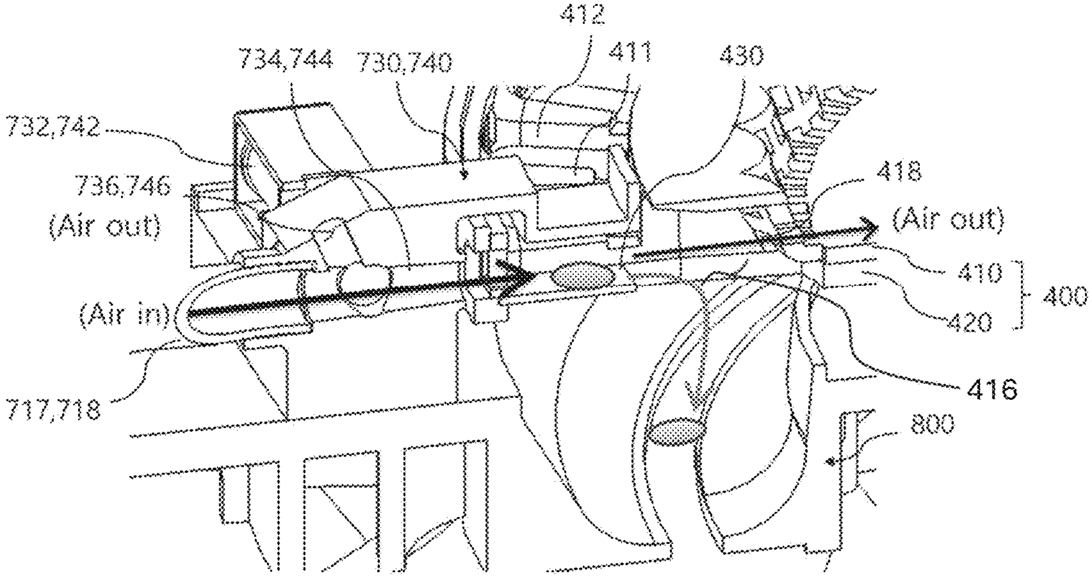

In FIG. 17, The green bean sorter 700 can include air pumps 710 and 714, a normal green bean processing block 720, a defective green bean processing block 730, and an indeterminable green bean processing block 740.

The normal green bean processing block 720, the defective green bean processing block 730, and the indeterminable green bean processing block 740 respectively define at least part of sorted bean transfer paths that are connected to corresponding spaces in the sorted green bean storage 900. The sorted bean transfer paths can include a normal bean path, a defective bean path, and a defective bean path. For example, the normal bean path can include the green bean-drop opening 416, through which a normal bean drops by the normal green bean processing block 720, and the normal green bean sorting hole 802 located underneath of the bean-drop opening 416 such that the normal bean is provided to the normal green bean storing box 910 (which is located underneath of the normal green bean sorting hole 802) by gravity. The defective bean path can be defined by the defective green bean processing block 730 sequentially through the bean-drop opening 416, the defective green bean sorting hole 804, and the defective bean storing box 920. The indeterminable bean path can be defined by the indeterminable green bean processing block 740 sequentially through the bean-drop opening 416, the residual green bean processing hole 824, and indeterminable bean storing box 930.

The air pumps 710 and 714 can include a first air pump 710 for exclusively supplying air to the normal green bean processing block 720, and a second air pump 714 for exclusively supplying air to the defective green bean processing block 730 and the indeterminable green bean processing block 740.

A first air duct 711 and a first air tube 712 can be connected to the first air pump 710, and the first air tube 712 can be connected to the normal green bean processing block 720. The air discharged from the first air pump 710 can be supplied to the normal green bean processing block 720 through the first air duct 711 and the first air tube 712.

In addition, the second air duct 715 can be connected to the second air pump 714. The second air duct 715 can be provided with a splitter 716 for dividing and supplying the air generated by the second air pump 714 in different directions. A second air tube 717 and a third air tube 718 can be connected to the splitter 716, the defective green bean processing block 730 can be connected to the second air tube 717, and an indeterminable green bean processing block 740 can be connected to the third air tube 718. Accordingly, the second air pump 714 can be connected to the defective green bean processing block 730 and the indeterminate green bean processing block 740 to supply air to each of the processing blocks 730 and 740.

The normal green bean processing block 720 can be located against the green bean rotary compartment 400, can be connected to the first air pump 710 to receive high-speed and high-pressure air pressure, and can push the green bean kernels determined as normal green beans by the processor 600 to the sorted green bean storage 900 by using the received air pressure.

Figure 15:
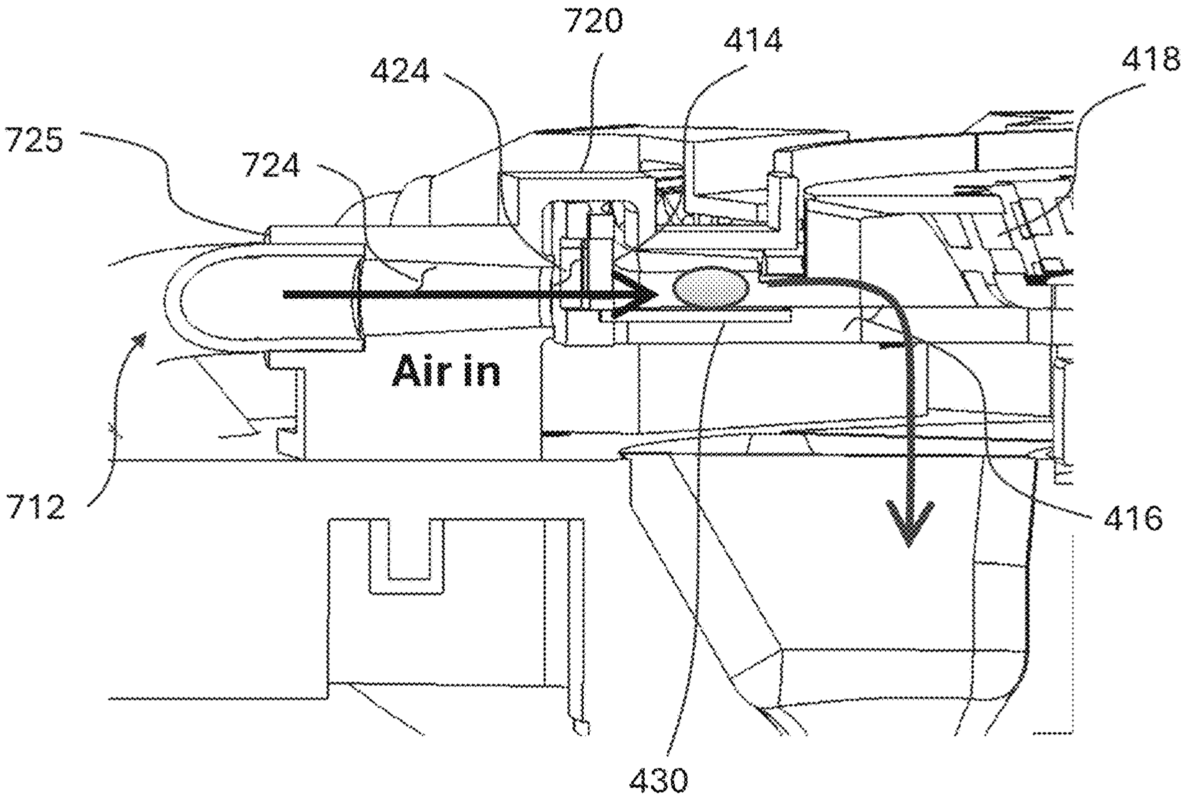
FIGS. 15 to 19 are views for describing an example operation of the green bean sorter shown in FIG. 14.
Figure 16A:
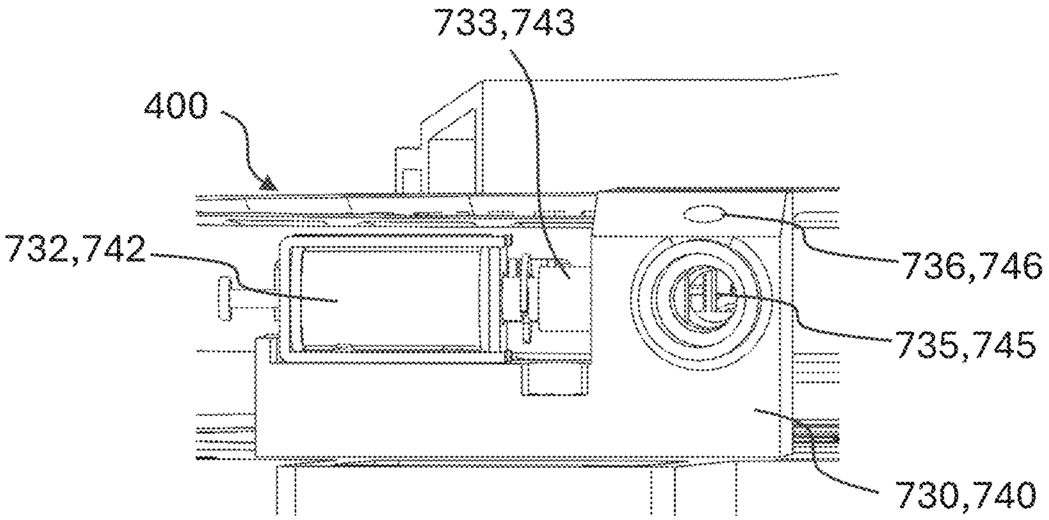
Figure 16B:
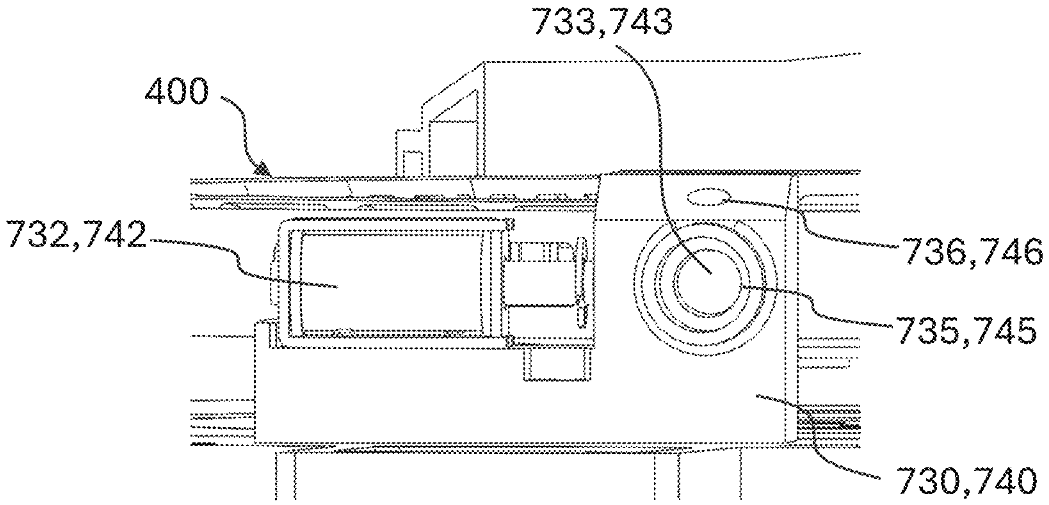

As shown in FIG. 15, the normal green bean processing block 720 can include a tube mounting part 725 on which the first air tube 712 is mounted.

A moving passage 724 through which air moves can be formed inside the normal green bean processing block 720, and the moving passage 724 can face a seating space 411 through the air inlet hole 424 and vertical linear bars 414 of the green bean rotary compartment 400.

The tube mounting part 725 and the moving passage 724 of the normal green bean processing block 720 can have the same shape as the tube mounting part 735 and the moving passage 734 of the defective green bean processing block 730 to be described later.

In some implementations, the first air pump 710 can be continuously operated, and the normal green bean processing block 720 can be always in an open state. With regard to the green bean kernels determined as normal green beans, the normal green bean kernels seated in the seating space 411 can be pushed through the moving passage of the normal green bean processing block 720 and thus can be accommodated in a normal green bean storing box 910 of the sorted green bean storage 900 through a green bean-drop openings 416.

Referring to FIGS. 16A to 19, the defective green bean processing block 730 can be disposed at a position adjacent to the normal green bean processing block 720.

The defective green bean processing block 730 can be located against the green bean rotary compartment 400, can be connected to the second air pump 714 to receive high-speed and high-pressure air pressure, and can push the green bean kernels determined as defective green beans by the processor 600 to the defective green bean storing box 920 by using the received air pressure.

The defective green bean processing block 730 can include the tube mounting part 735 at which the second air tube 717 is mounted (in FIG. 14).

The first solenoid valve 732 can be mounted at the defective green bean processing block 730. The first solenoid valve 732 can be operated only when pushing the green bean kernels determined as defective green beans through the air supplied from the second air pump 714 (in FIG. 14) to the defective green bean processing block 730.

The first solenoid valve 732 can be provided inside the defective green bean processing block 730, and when the first solenoid valve 732 is operated, an air passage blocked by an actuator 733 attached to an end of the first solenoid valve 732 can be opened to form the moving passage 734 (in FIG. 17A) through which air moves. The moving passage 734 can face the seating space 411 through the air inlet hole 424 and vertical linear bars 414 of the green bean rotary compartment 400.

In some implementations, the process of determining defective green beans can be selectively performed by the processor 600, and thus the high-speed and high-pressure air supplied by the second air pump 714 can be operated only when defective green beans are selected from among the green bean kernels. Accordingly, the moving passage 734 can be blocked by the actuator 733 attached to the end of the first solenoid valve 732. When the first solenoid valve 732 is not operated and thus the moving passage 734 is blocked by the actuator 733, the air supplied from the second air pump 714 can flow backward and thus the second air pump 714 can be overloaded. In order to prevent such a problem, in some examples, the air supplied from the second air pump 714 can be discharged the air through at least one first air discharge hole 736.

The first air discharge hole 736 can allow the air supplied from the second air pump 714 to be discharged to the outside of the defective green bean processing block 730 before the first solenoid valve 732 is operated, thereby preventing the air from flowing backward to the second air pump 714 and preventing the second air pump 714 from being overloaded.

As shown in FIGS. 16A to 19, the indeterminable green bean processing block 740 can be disposed at a position adjacent to the defective green bean processing block 730.

The indeterminable green bean processing block 740 can be located against the green bean rotary compartment 400, can be connected to the second air pump 714 to receive high-speed and high-pressure air pressure, and can push the green bean kernels determined as indeterminable green beans by the processor 600 to the indeterminable green bean storing box 930 by using the received air pressure.

The indeterminable green bean processing block 740 can include the tube mounting part 745 at which the third air tube 718 is mounted.

In addition, a second solenoid valve 742 can be mounted at the indeterminable green bean processing block 740. The second solenoid valve 742 can be operated only when pushing the green bean kernels determined as indeterminable green beans through the air supplied from the second air pump 714 to the indeterminable green bean processing block 740.

When the second solenoid valve 742 is operated, the air passage blocked by the actuator 743 attached to the end of the second solenoid valve 742 can be opened to form the moving passage 744, through which air moves, inside the indeterminable green bean processing block 740. The moving passage 744 can face the seating space 411 through the air inlet hole 424 and vertical linear bars 414 of the green bean rotary compartment 400.

In some implementations, the process of determining indeterminable green beans can be selectively performed by the processor 600, and thus the high-speed and high-pressure air supplied by the second air pump 714 can be operated only when indeterminable green beans are selected from among the green bean kernels. Accordingly, the moving passage 744 can be blocked by the second solenoid valve 742. When the second solenoid valve 742 is not operated and the moving passage 744 is blocked, the air supplied from the second air pump 714 can flow backward and thus the second air pump 714 can be overloaded. In order to prevent such a problem, the air supplied from the second air pump 714 can be discharged the air through at least one second air discharge hole 746.

The second air discharge hole 746 can allow the air supplied from the second air pump 714 to be discharged to the outside of the indeterminable green bean processing block 740 before the second solenoid valve 742 is operated, thereby preventing the air from flowing backward to the second air pump 714 and preventing the second air pump 714 from being overloaded.

Figure 20:
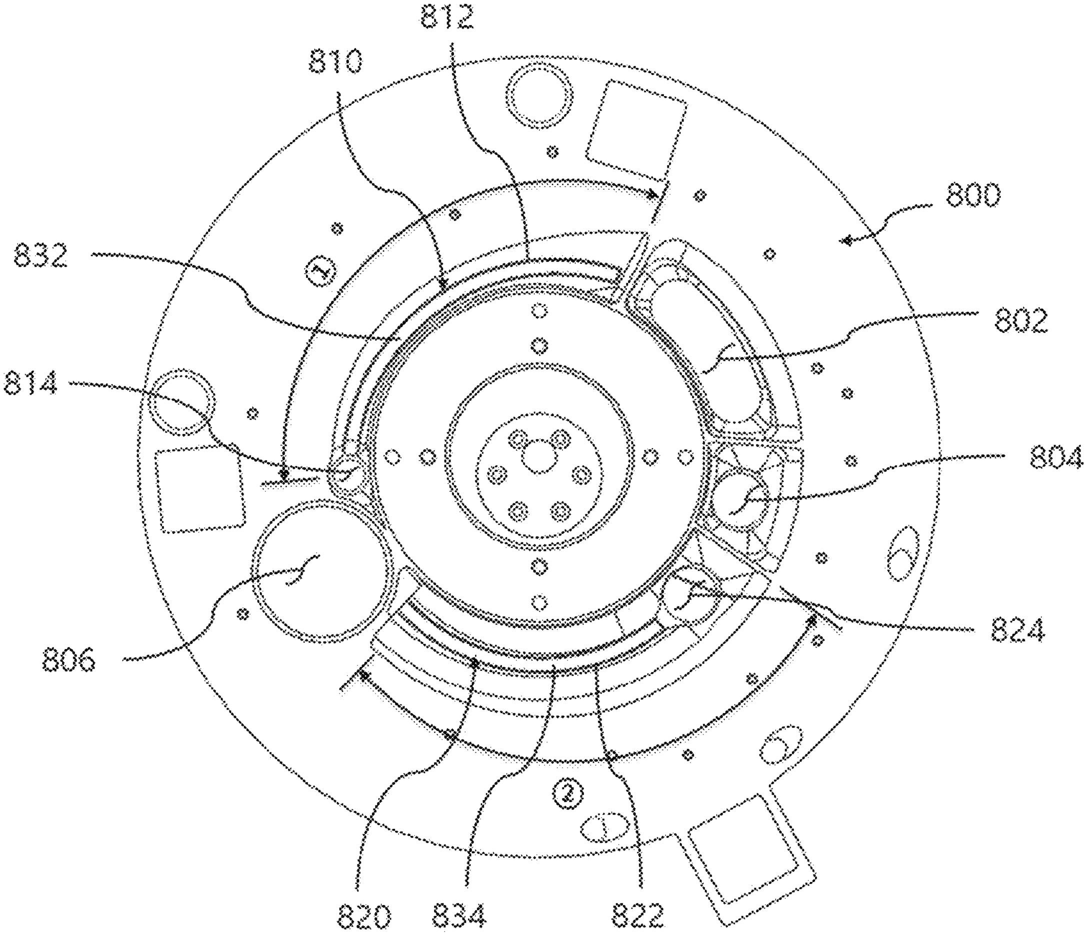
FIG. 20 is the top view showing the residual green bean collector regions and holes.
Figure 21:
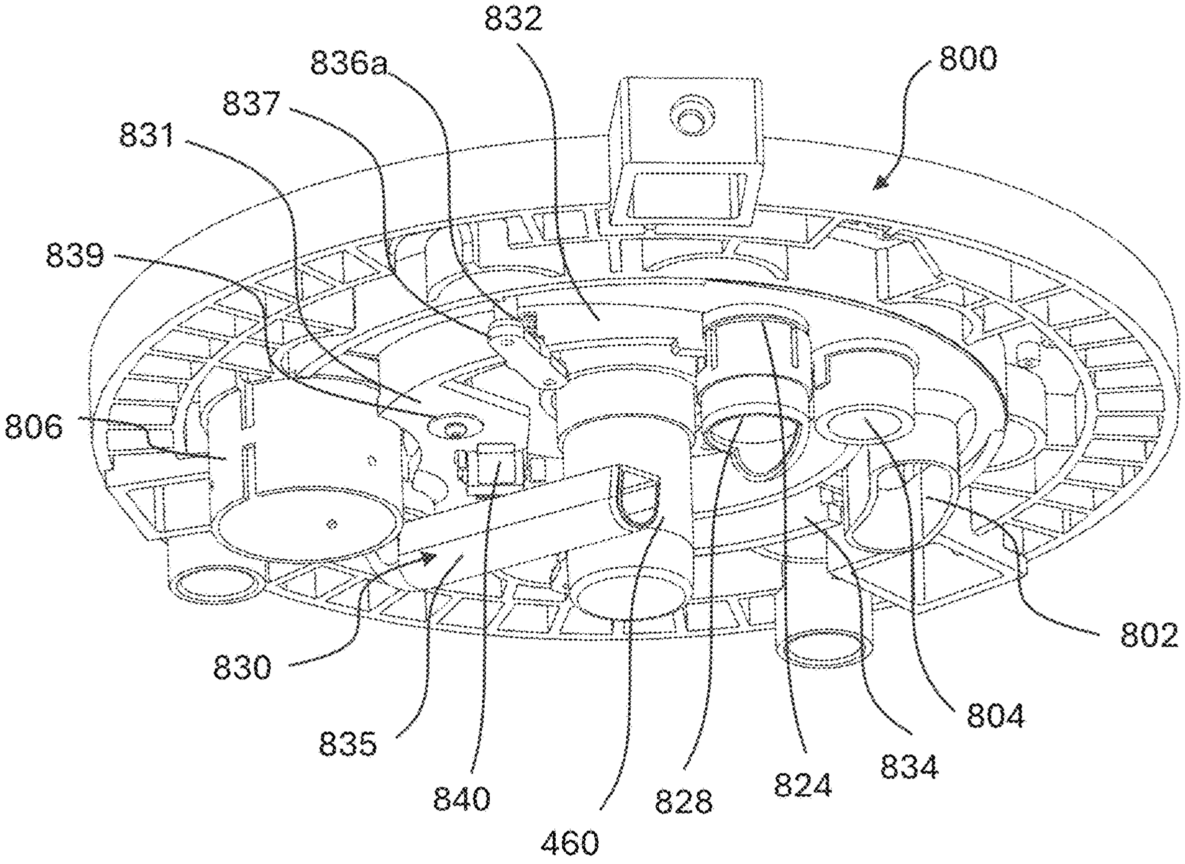
FIGS. 21 and 22 are bottom views showing the residual green bean collector shown in FIG. 20.
Figure 22:
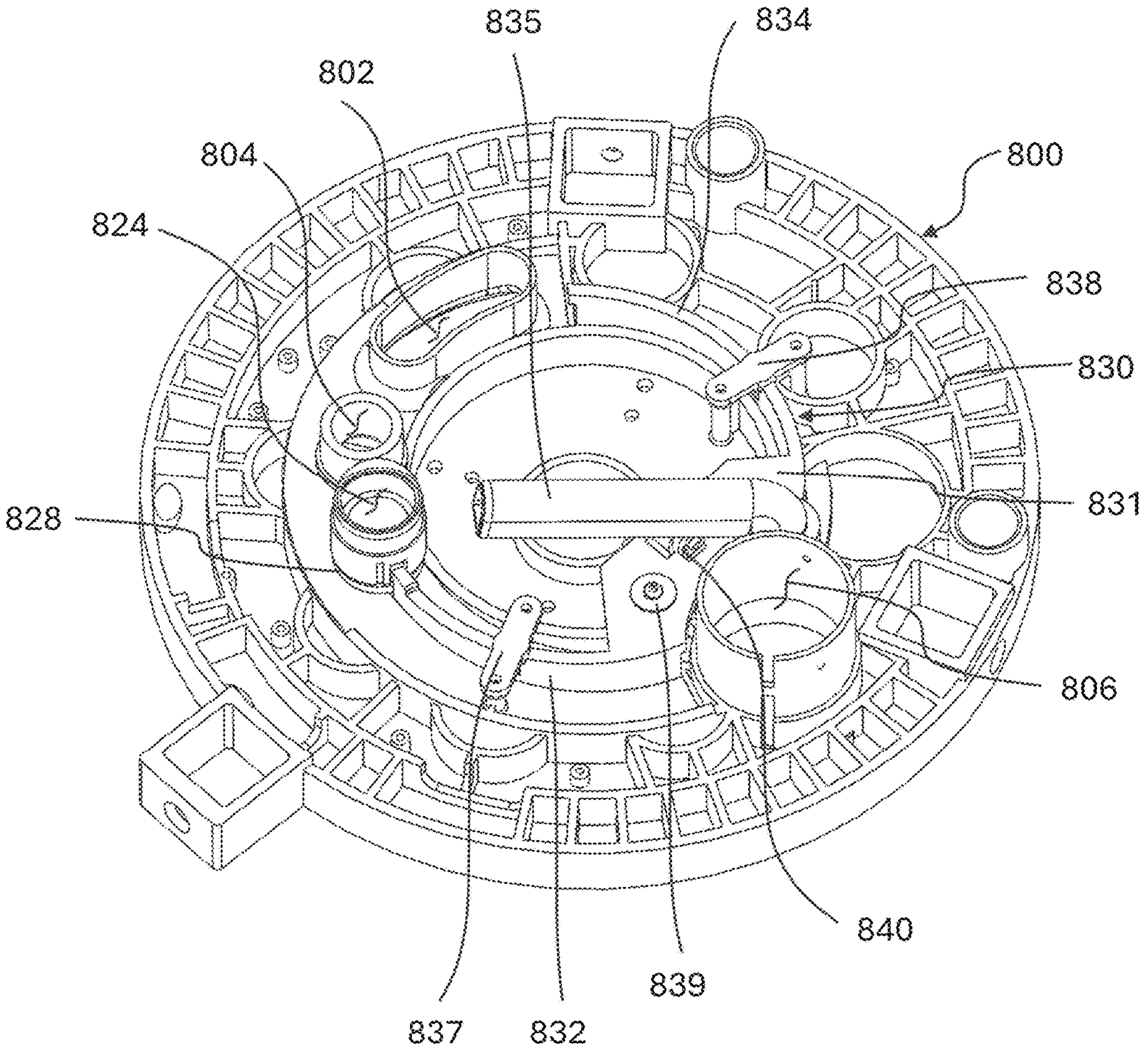
Figure 23:
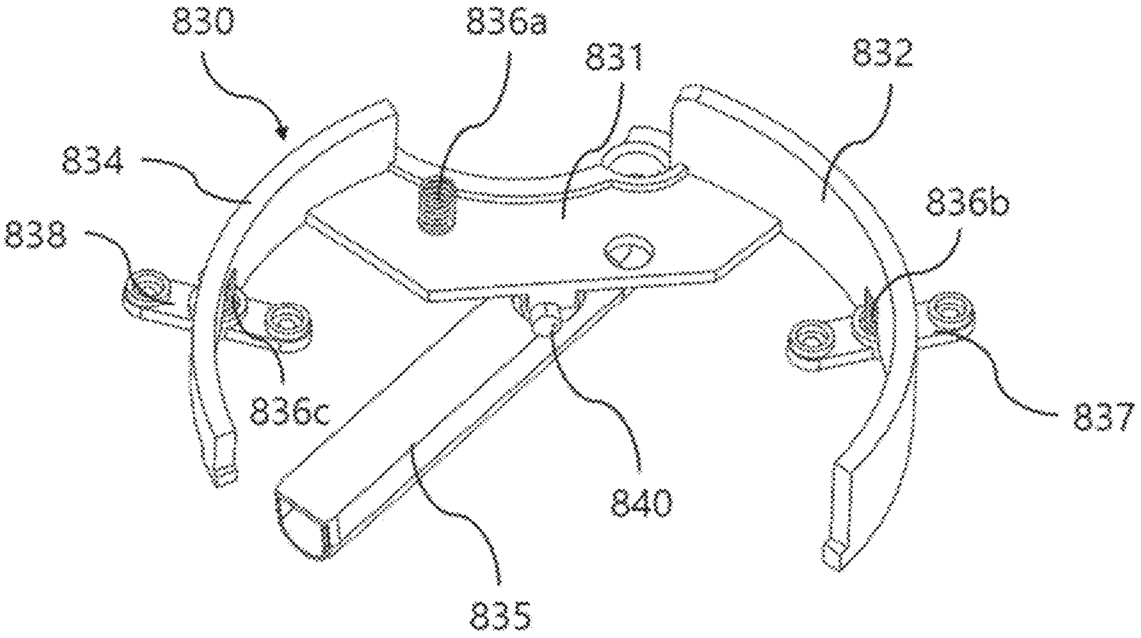
FIG. 23 is a view showing a residual green bean processing device mounted in FIG. 22.
Figure 24:
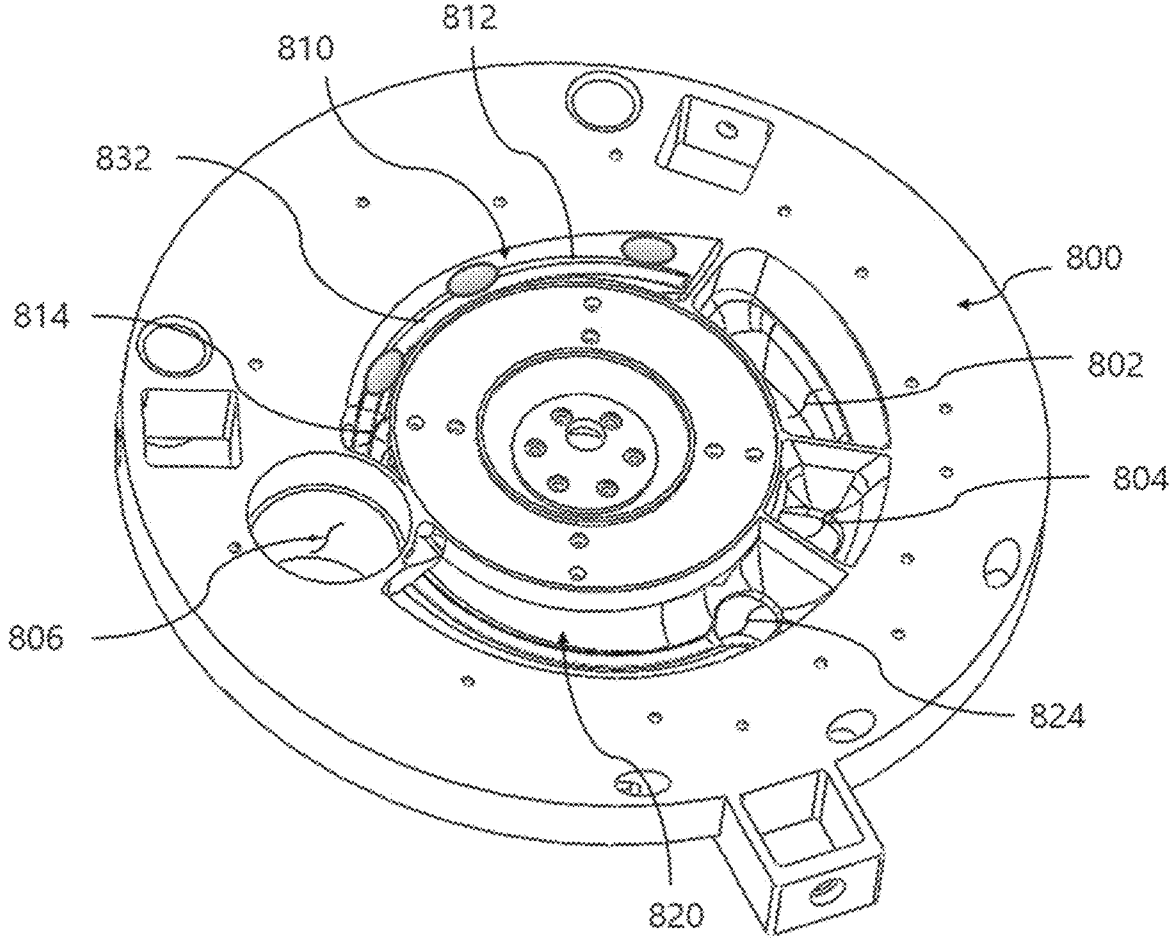
FIGS. 24 and 25 are views showing an example process of the residual green beans in a first region of the residual green bean collector shown in FIG. 20.
Figure 25:
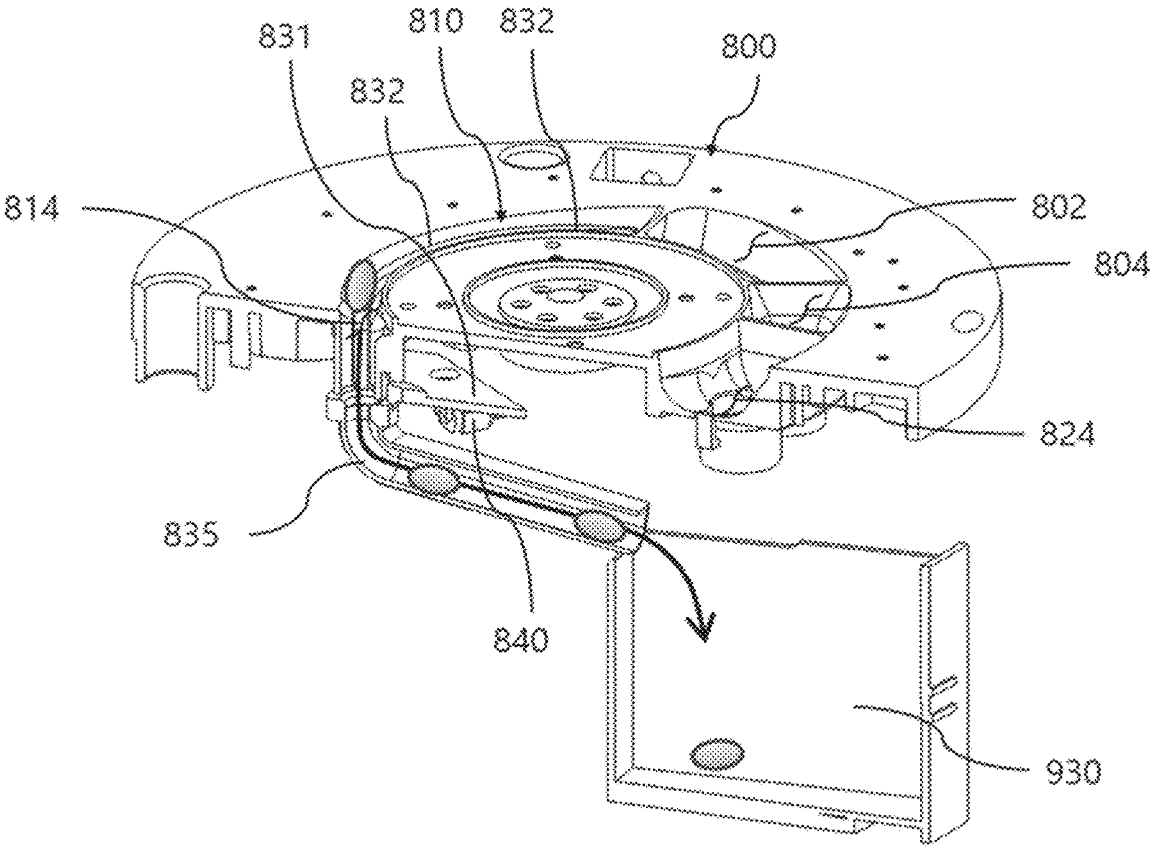
Figure 26:
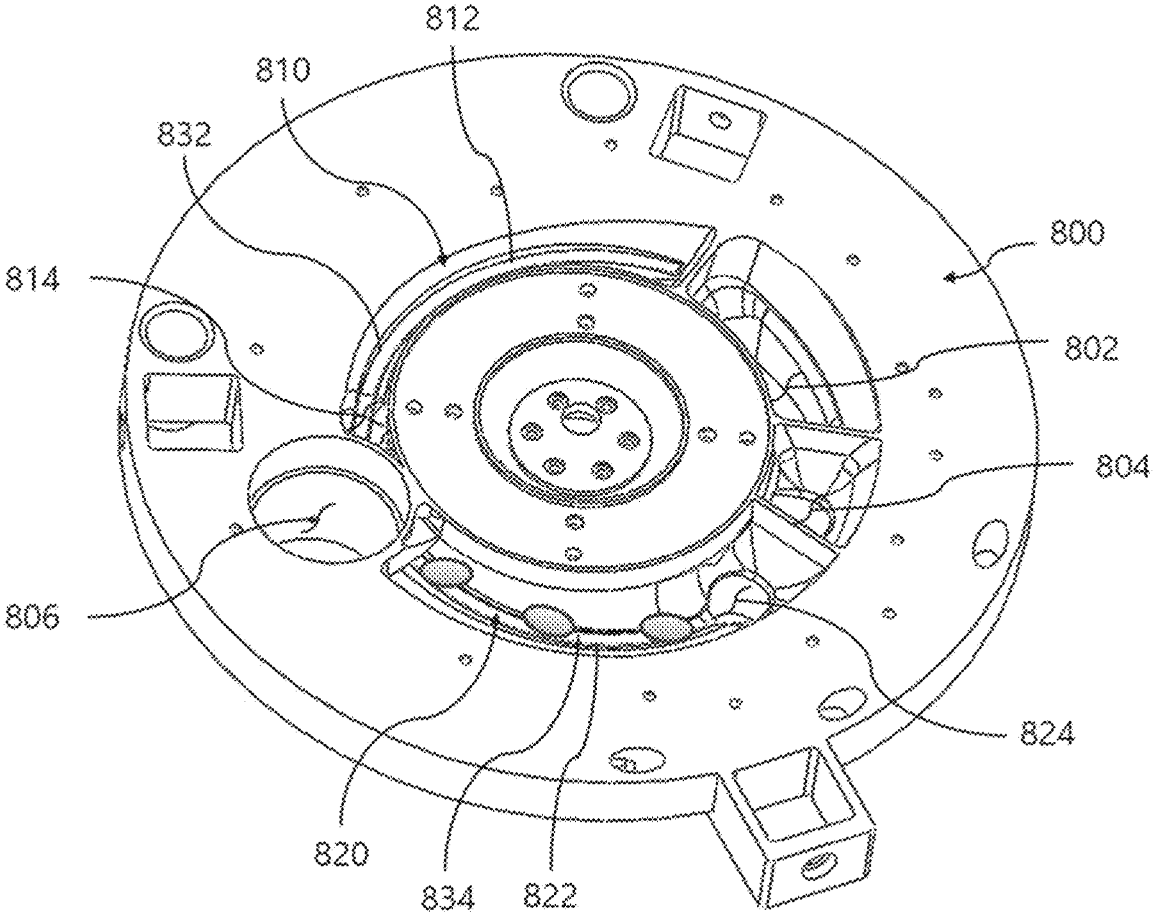
FIGS. 26 and 27 are views showing an example process of sorting green beans in a second region of the residual green bean collector shown in FIG. 20.
Figure 27:
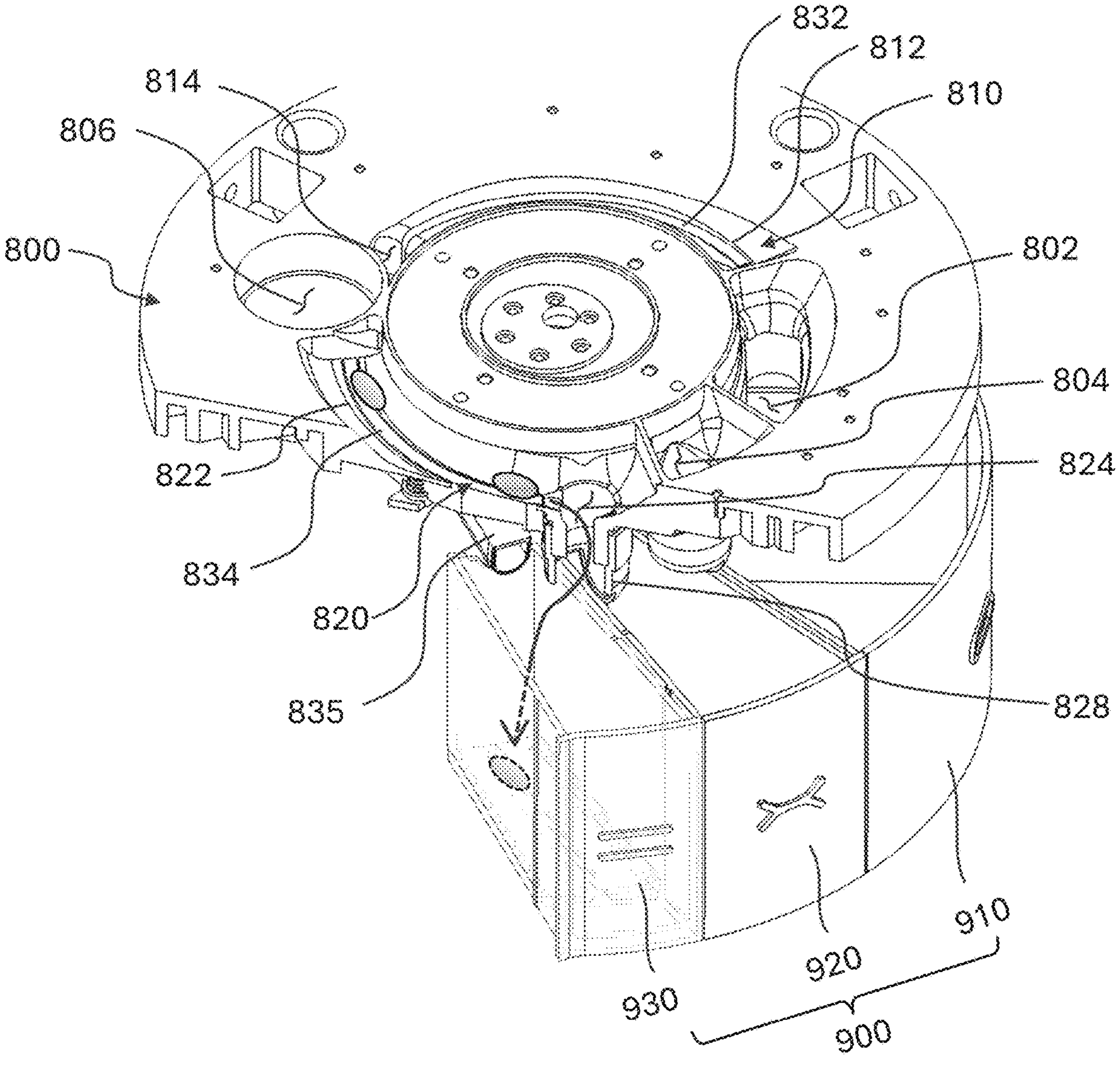

FIG. 20 is a front view showing the residual green bean collector. FIGS. 21 and 22 are bottom views showing the residual green bean collector shown in FIG. 20. FIG. 23 is a view showing a green bean processing device mounted in FIGS. 21 and 22. FIGS. 24 and 25 are views showing a process of sorting green beans in a first region of the residual green bean collector shown in FIG. 20, and FIGS. 26 and 27 are views showing a process of sorting green beans in a second region of the residual green bean collector shown in FIG. 20.

Referring to FIGS. 20 to 27, the green bean defect sorter 1000 can further include a residual green bean collector 800.

The residual green bean collector 800 can be mounted at a lower end of the green bean rotary compartment 400, and can hold the green bean kernels separated from the green bean rotary compartment 400 or unsorted by the green bean sorter 700 to be hold during the green bean sorting operation. Later, transport the green beans to the indeterminable green bean storing box 930 after the sorting operation.

The residual green bean collector 800 can be divided into a first region (①) and a second region (②).

For example, the first region (①) can be a portion for holding the green bean kernels before being photographed by the lower camera 520, and the second region (②) can be a portion for holding the green bean kernels after being photographed by the lower camera 520 during the green bean sorter operation.

The first region (①) can be provided with a first residual green bean transfer path 810 through which the green bean kernels are moved and a first residual green bean processing hole 814 through which the green bean kernels moved along the first residual green bean transfer path 810 are released from the first region (①) and which communicates with the indeterminable green bean storing box 930 (in FIGS. 25 and 27).

The first residual green bean transfer path 810 can be formed as a declined surface having a predetermined inclination angle. The angle of the inclined surface of the first residual green bean transfer path 810 can be decreased toward the first residual green bean processing hole 814. Accordingly, the green bean kernels which are escaped or not sorted by the green bean sorter 700 on the green bean rotary compartment 400, but dropped down to the first residual green bean transfer path 810 can move toward the first residual green bean processing hole 814 along the declined surface of the first residual green bean transfer path 810, and then can pass through the first residual green bean processing hole 814 and moving along the residual bean processing path 835 (in FIG. 21), and thus can be stored in the indeterminable green bean storing box 930.

In addition, the first residual green bean transfer path 810 can include a first groove 812. At least a partial region of a green bean processing device 830 to be described later can be mounted in the first groove 812.

The second region ((2)) can be provided with a second residual green bean transfer path 820 through which the green bean kernels are moved and a second residual green bean processing hole 824 through which the green bean kernels moved along the second residual green bean transfer path 820 are discharged from the second region ((2)) and which communicates with the indeterminable green bean storing box 930.

The second residual green bean transfer path 820 can be formed as a declined surface having a predetermined declination angle. The angle of the declined surface of the second residual green bean transfer path 820 can be decreased toward the second residual green bean processing hole 824. Accordingly, the green bean kernels which are escaped or not sorted by the green bean sorter 700 on the green bean rotary compartment 400, but dropped down to the second residual green bean transfer path 820 can move toward the second residual green bean processing hole 824 along the inclined surface of the second residual green bean transfer path 820, and then can pass through the second residual green bean processing hole 824 and thus can be stored in the indeterminable green bean storing box 930.

In addition, the second residual green bean transfer path 820 can include a second groove 822.

At least a partial region of the green bean processing device 830 to be described later can be mounted in the second groove 822.

A guide member 828 (in FIG. 21) can be mounted in the second residual green bean processing hole 824.

The guide member 828 can cover an interval between the second residual green bean processing hole 824 and the indeterminable e green bean storing box 930, thereby providing a guide such that the green bean kernels passing through the second residual green bean processing hole 824 may not bounce to an outside, but can be stored in the indeterminable green bean storing box 930.

In some implementations, the green bean kernels accommodated in the indeterminable green bean storing box 930 through the first region ((1)) and the second region ((2)) can be introduced into the storing container 100 by a user as necessary, and then can be subjected to a process of sorting defects again or can be discarded.

The residual green bean collector 800 can further include the green bean processing device 830 (in FIG. 23).

In FIG. 22, The green bean processing device 830 can be mounted at a lower end of the residual green bean collector 800. The green bean processing device 830 can be stably coupled to the lower end of the residual green bean collector 800 using a mounting member 839 including a bolt-washer.

In FIG. 23, The green bean processing device 830 can include a mounting frame 831 mounted and fixed to the residual green bean collector 800, a first frame 832 extending from the mounting frame 831 in one direction, a second frame 834 extending from the mounting frame 831 in another direction different from the first frame 832, and a processing path 835 extending from the first frame 832.

In FIG. 20, The first frame 832 can be inserted into the first groove 812 of the first residual green bean transfer path 810, the second frame 834 can be inserted into the second groove 822 of the second residual green bean transfer path 820, and the processing path 835 (in FIGS. 21, 22, and 23) can make a connection between the first residual green bean processing hole 814 and the indeterminable green bean storing box 930.

In FIG. 23, In some implementations, the green bean processing device 830 can be maintained at a predetermined interval from the residual green bean collector 800 by three springs 836*a*, 836*b*, and 836*c* disposed at different positions from each other, while being fixed to the lower end of the residual green bean collector 800 by the mounting members 837, 838, and 839 in FIG. 22. Out of the three springs, a first spring 836*a* can be mounted with washer 839 at an upper end of the mounting frame 831, a second spring 836*b* can be mounted with the spring holder 837 at an upper end of the first frame 832, and a third spring 836*c* can be mounted with the spring holder 838 at an upper end of the second frame 834. Accordingly, even if an external force occurs to or vibration is applied to the green bean processing device 830, the green bean processing device 830 can be floated to avoid colliding with the residual green bean collector 800.

The green bean processing device 830 can further include a second vibration motor 840. The second vibration motor 840 can be mounted at a lower end of the mounting frame 831.

The vibration generated by the second vibration motor 840 can be transmitted to a support frame 831, the first frame 832, the second frame 834, and the processing path 835 of the green bean processing device 830.

The vibration transmitted from the second vibration motor 840 to the first frame 832 can be transmitted to the first residual green bean transfer path 810 located in the first region ((1)) through the first groove 812, and thus can provide a help such that the green bean kernels moved along the first residual green bean transfer path 810 may not be accumulated on the first residual green bean transfer path 810, but can be smoothly moved toward the first residual green bean processing hole 814 to pass through the first residual green bean processing hole 814. In addition, the vibration transmitted from the second vibration motor 840 to the processing path 835 can provide help such that the green bean kernels passing through the first residual green bean processing hole 814 can be moved along the processing path 835 and stored in the indeterminable green bean storing box 930.

The vibration transmitted from the second vibration motor 840 to the second frame 834 can be transmitted to the second residual green bean transfer path 820 located in the second region ((2)) through the second groove 822, and thus can provide a help such that the green bean kernels may not be accumulated on the second residual green bean transfer path 820, but can be smoothly moved toward the second residual green bean processing hole 824 to pass through the second residual green bean processing hole 824. In addition, the guide member 828 can provide help such that the green bean kernels passing through the second residual green bean processing hole 824 can be moved along the guide member 828 and stored in the indeterminable green bean storing box 930.

In FIG. 20, the normal green bean sorting hole 802 can be formed between the first region ((1)) and the second region ((2)). The green bean kernels sorted as normal green beans can pass through the normal green bean sorting hole 802. The green bean kernels sorted as normal green beans by the green bean sorter 700 can sequentially pass through the green bean-drop openings 416 of the green bean rotary compartment 400 as well as the normal green bean sorting hole 802 and can be stored in the normal green bean storing box 910.

The defective green bean sorting hole 804 can be formed between the first region (①) and the second region (②), and provided at a position adjacent to the normal green bean sorting hole 802. The defective green bean sorting hole 804 can be connected to the defective green bean storing box 920.

The camera installing hole 806 can be provided between the first region (①) and the second region (②), and a lower camera 520 can be mounted thereon.

Referring to FIG. 27, in order to store the normal green beans, the defective green beans, and the indeterminable green beans sorted by the green bean sorter 700, the sorted green bean storage 900 can include a normal green bean storing box 910 for storing the sorted normal green beans, a defective green bean storing box 920 for storing the sorted defective green beans, and an indeterminable green bean storing box 930 for storing the sorted indeterminable green beans.

The normal green bean storing box 910, the defective green bean storing box 920, and the indeterminable green bean storing box 930 can be designed to be easily identified by a user from the outside. For example, the normal green bean storing box 910 can have an appearance design represented by "O", the defective green bean storing box 920 can have an appearance design represented by "X", and the indeterminable green bean storing box 930 can have an appearance design represented by "=".

Hereinafter, an operation principle of the green bean defect sorter 1000 will be briefly described with reference to FIGS. 4 to 27.

A large amount of green beans stored in the storing container 100 can fall onto the conical rotating plate 230 along the conical support 110 and can be supplied to the green bean transfer path 240 through the opening 222 by the rotation of the conical rotating plate 230.

The green beans supplied to the green bean transfer path 240 can be moved by a first belt 320 of a green bean supply regulator 300 in a state in which an interval between the adjacent green beans is adjusted through the green bean supply regulator 300.

The green bean kernels placed on the first belt 320 of the green bean supply regulator 300 can fall to the green bean rotary compartments 400 that is rotating counterclockwise.

The green bean kernels dropped down to the green bean rotary compartment 400 can be seated on a support plate 430, which made of a transparent material, in a seating space 411.

With regard to the green bean kernels seated on the support plate 430 formed of a transparent material, an upper image and a lower image of the green bean kernels can be captured through an upper camera 510 and a lower camera 520 of the imaging device 500, and the captured images can be merged to form one completed image of green bean kernels.

Regarding the image of green bean kernels formed through the imaging device 500, a processor 600 can determine whether the green bean kernel is defective or not using an image learning algorithm. The processor 600 can repeatedly perform a process of comparing a previously stored image of the normal green bean with an image of the green bean kernel provided from the imaging device 500 to determine whether the green bean kernel is defective or not.

Depending on whether the green bean kernel is defective or not, which is determined through the processor 600, it can be stored in the sorted green bean storage 900.

For example, when the green bean kernel is determined as the normal green bean, the green bean kernel determined as the normal green bean can sequentially pass through the green bean-drop openings 416 of the green bean rotary compartment 400 as well as the normal green bean sorting hole 802 by the normal green bean processing block 720, and then can be stored in the normal green bean storing box 910 of the sorted green bean storage 900.

In addition, when the green bean kernel is determined as the defective green bean, the green bean kernel determined as the defective green bean can sequentially pass through the green bean-drop openings 416 of the green bean rotary compartment 400 as well as the defective green bean sorting hole 804 by the defective green bean processing block, and then can be stored in the defective green bean storing box 920 of the sorted green bean storage 900.

In addition, when the green bean kernel is determined as the indeterminable green bean, the green bean kernel determined as the indeterminable green bean can sequentially pass through the green bean-drop openings 416 of the green bean rotary compartment 400 as well as the second residual green bean processing hole 824 by the indeterminable green bean processing block 740, and then can be stored in the indeterminable green bean storing box 930 of the sorted green bean storage 900.

In some implementations, in a process of sorting the green bean kernels through the green bean sorter 700 in the green bean rotary compartment 400, the green bean kernels bounced from the green bean rotary compartment 400 can be stored in the indeterminable green bean storing box 930 through the residual green bean collector 800.

Out of the green bean kernels bounced from the green bean rotary compartment 400, the green bean kernels before being photographed by the imaging device 500 can be stored in the indeterminable green bean storing box 930 of the sorted green bean storage 900 in the first region (①) of the residual green bean collector 800. The green bean kernels positioned in the first region (①) can be moved along the first residual green bean transfer path 810, can pass through the first residual green bean processing hole 814, and then can be moved along the processing path 835 of the green bean processing device 830, and can be stored in the indeterminable green bean storing box 930.

In this case, by the vibration generated by the second vibration motor 840 of the green bean processing device 830, the green bean kernels in the first region (①) can be stably moved along the first residual green bean transfer path 810 to pass through the first residual green bean processing hole 814, and then can be stably transferred to the indeterminable green bean storing box 930 of the sorted green bean storage 900 through the processing path 835.

In addition, out of the green bean kernels bounced from the green bean rotary compartment 400, the green bean kernels after being photographed by the imaging device 500 can be stored in the indeterminable green bean storing box 930 of the sorted green bean storage 900 in the second region (②) of the residual green bean collector 800. The green bean kernels positioned in the second region (②) can be moved along the second residual green bean transfer path 820 to pass through the second residual green bean processing hole 824, and then can be stored in the indeterminable green bean storing box 930 by the guide member 828.

In this case, by the vibration generated by the second vibration motor 840 of the green bean processing device 830, the green bean kernels in the second region (②) can be stably moved along the second residual green bean transfer path 820 to pass through the second residual green bean processing hole 824, and then can be stably transferred to the indeterminable green bean storing box 930 of the sorted green bean storage 900 along the guide member 828.

In some implementations, the green bean kernels accommodated in the indeterminable green bean storing box 930 through the first region (①) and the second region (②) can be introduced into the storing container 100 by a user as necessary, and then can be subjected to a process of sorting green bean defects again or can be discarded.

The example implementations of the present disclosure described above are disclosed for the purpose of illustration, and various modifications and variations of the technical spirit of the present disclosure can be made by those skilled in the art to which the present disclosure pertains, and such modifications and variations will fall within the scope of protection of the present disclosure.

What is claimed is:

1. A bean defect sorter comprising:

an imaging device configured to capture images of beans;

a bean rotary compartment configured to rotate and position each bean for imaging by the imaging device;

a processor including a learning algorithm that is configured to:

receive the images from the imaging device, determine, from the images, whether each bean has a defect, and classify each bean as one of a normal bean, a defective bean, and an indeterminable bean based on image features extracted by the learning algorithm;

a bean sorter configured to physically separate each bean from the bean rotary compartment according to a classification result from the processor; and a sorted bean storage configured to store each of the normal bean, the defective bean, and the indeterminable bean in separate storage spaces.

2. The bean defect sorter of claim 1, wherein the learning algorithm comprises a Convolutional Neural Network (CNN).

3. The bean defect sorter of claim 2, wherein the learning algorithm further comprises a Residual Network (ResNet).

4. The bean defect sorter of claim 1, wherein the imaging device comprises:

a first camera configured to capture images of a top surface of each bean on the bean rotary compartment; and a second camera configured to capture images of a bottom surface of each bean, and wherein the processor is configured to merge the images from the first camera and the second camera to provide a complete image of each bean for classification.

5. The bean defect sorter of claim 1, wherein the processor is configured to divide pre-training images into training and validation.

6. The bean defect sorter of claim 1, wherein the processor is configured to:

perform data augmentation on training images used to train the learning algorithm, the data augmentation comprising applying variations to the training images to increase diversity and quantity of the training images.

7. The bean defect sorter of claim 6, wherein the processor is configured to:

perform normalization and pixel mean subtraction on the training images; and set hyper-parameter values including a batch size, an epoch size, and a learning rate for training the learning algorithm.

8. The bean defect sorter of claim 1, wherein the bean rotary compartment defines a plurality of seating spaces, each of the plurality of seating space being configured to receive one of the beans guided to the bean rotary compartment.

9. The bean defect sorter of claim 8, wherein the bean sorter comprises:

a plurality of air pumps; and a plurality of air tubes connected to the plurality of air pumps, respectively, each of the plurality of air tubes being configured to supply air from one of the plurality of air pumps toward one of the plurality of seating spaces of the bean rotary compartment to thereby physically separate each bean from the bean rotary compartment according to the classification result.

10. The bean defect sorter of claim 9, wherein the bean rotary compartment further defines a plurality of bean-drop openings that are in fluid communication with the plurality of seating spaces, respectively, and configured to provide a passage for sorted beans to the sorted bean storage.

11. The bean defect sorter of claim 1, wherein the bean rotary compartment comprises:

at least one disk plate that defines a plurality of seating spaces, each of the plurality of seating spaces being configured to receive one of the beans; and a support plate that is made of a transparent material and mounted to the at least one disk plate, the support plate defining bottom surfaces of the plurality of seating spaces configured to seat the beans thereon.

12. The bean defect sorter of claim 11, wherein the imaging device comprises:

a first camera positioned above the support plate and configured to capture images of a top surface of each bean on the support plate; and a second camera positioned below the support plate and configured to capture images of a bottom surface of each bean through the support plate, and wherein the processor is configured to merge the images from the first camera and the second camera to provide a complete image of each bean for classification.

13. The bean defect sorter of claim 11, wherein the at least one disk plate comprises:

a disk lower plate that defines a plurality of through-holes; and a disk upper plate that is coupled to the disk lower plate, the disk upper plate comprising a plurality of partition walls that define the plurality of seating spaces in fluid communication with the plurality of through-holes, respectively.

* * * * *